United States Patent
Schlei

(10) Patent No.: US 9,607,431 B2
(45) Date of Patent: Mar. 28, 2017

(54) METHOD FOR HYPERSURFACE CONSTRUCTION IN N DIMENSIONS

(75) Inventor: Bernd Schlei, Bad Arolsen (DE)

(73) Assignee: GSI HELMHOLTZZENTRUM FUER SCHWERIONENFORSCHUNG GMBH, Darmstadt (DE)

(*) Notice: Subject to any disclaimer, the term of this patent is extended or adjusted under 35 U.S.C. 154(b) by 381 days.

(21) Appl. No.: 14/123,100

(22) PCT Filed: May 14, 2012

(86) PCT No.: PCT/EP2012/058873
§ 371 (c)(1),
(2), (4) Date: Nov. 28, 2013

(87) PCT Pub. No.: WO2012/163657
PCT Pub. Date: Dec. 6, 2012

(65) Prior Publication Data
US 2014/0104270 A1    Apr. 17, 2014

(30) Foreign Application Priority Data

May 30, 2011   (DE) .................. 10 2011 050 721
Jun. 20, 2011   (DE) .................. 10 2011 051 203

(51) Int. Cl.
*G06T 17/20*   (2006.01)
*G06T 17/00*   (2006.01)

(52) U.S. Cl.
CPC .............. *G06T 17/00* (2013.01); *G06T 17/20* (2013.01); *G06T 2210/41* (2013.01)

(58) Field of Classification Search
None
See application file for complete search history.

(56) References Cited

U.S. PATENT DOCUMENTS 7,538,764 B2    5/2009 Salomie

OTHER PUBLICATIONS

Hugues Hoppe, Tony DeRose, Tom Duchamp, John McDonald, Werner Stuetzle, "Mesh Optimization", Aug. 6, 1993, ACM, SIGGRAPH '93 Proceedings of the 20th annual conference on Computer graphics and interactive techniques, pp. 19-26.*

Weiyin Ma, Xiaohu Ma, Shiu-Kit Tso, Zhigeng Pan, "A direct approach for subdivision surface fitting from a dense triangle mesh", May 2004, Elsevier, Computer-Aided Design, vol. 36, Issue 6, pp. 525-536.*

(Continued)

*Primary Examiner* — Robert Bader
(74) *Attorney, Agent, or Firm* — Leydig, Voit & Mayer, Ltd.

(57) ABSTRACT

A method for determining boundary hypersurfaces from data matrices includes identifying intermediate hypersurfaces, situated between two respective matrix elements, that correspond to at least a portion of at least one boundary hypersurface to be determined. The identified intermediate hypersurfaces are represented by points that are adjacent to the intermediate hypersurfaces. The points that are adjacent to the intermediate hypersurfaces are connected by at least one respective closed curve. Hypersurface components formed by the closed curves are combined to form at least one boundary hypersurface.

19 Claims, 16 Drawing Sheets

(56) References Cited

OTHER PUBLICATIONS

Michael Garland, Yuan Zhou, "Quadric-Based Simplification in Any Dimension", Apr. 2005, ACM, ACM Transactions on Graphics, vol. 24, No. 2, pp. 209-239.*
B. R. Schlei, "A New Computational Framework for 2D Shape-Enclosing Contours", May 4, 2009, Elsevier, Image and Vision Computing, vol. 27, Issue 6, pp. 637-647.*
B.R. Schlei: "Speeding Up the 3D Surface Generator, VESTA", arxiv.org e-print archive, Dec. 14, 2010 (Dec. 14, 2010), Aug. 22, 2012.
B.R. Schlei: "Volume-Enclosing Surface Extraction", arxiv.org e-Print archive, Nov. 1, 2010.
B.R. Schlei: "Numerical Freeze-out Hyper-Surface Extraction Numerical Freeze-out Hyper-Surface Extraction four dimensions with the STEVE", Uni Frankfurt, Deutschland, May 6, 2009.
Bhaniramka P, et al.: "Isosurface construction in any dimension using convex hulls", IEEE Transactions on Visualization and Computer Graphics, IEEE Service Center, Los Alamitos, CA, US, Bd. 10, Nr. 2, Mar. 1, 2004. pp. 130-141, XP011105510, ISSN: 1077-2626, DOI: 10.1109/TVCG, 2004.1260765.
Bhaniramka P, et al.: "Isosurfacing in higher dimensions", Proceedings Visualization 2000, VIS 2000 (Cat. No. 00CH37145) IEEE Piscataway, NJ, USA, Dec. 2000, pp. 267-273, 566, ISBN_ 0-7803-6478-3.
T.S. Newman, et al.: "A survey of the Marching Cubes Algorithm" Computers & Graphics, vol. 30 (Dec. 2006, pp. 854-879).
W.E. Lorensen, et al. "Marching Cubes: A High Resolution 3D Surface Construction Algorithm", Comput. Graph. vol. 21 (Dec. 1987), pp. 163-169.

* cited by examiner (a)

(b)

(c)

(d)

(e)

(f)

METHOD FOR HYPERSURFACE CONSTRUCTION IN N DIMENSIONS

CROSS REFERENCE TO RELATED APPLICATIONS

This application is a U.S. National Phase application under 35 U.S.C. §371 of International Application No. PCT/EP2012/058873, filed May 14, 2012, and claims priority from German Patent Application No. DE 10 2011 051 203.9, filed Jun. 20, 2011, and from German Patent Application No. DE 10 2011 050 721.3, filed May 30, 2011. The International Application was published in German on Dec. 6, 2012 as WO 2012/163657 A1 under PCT Article 21.

FIELD

The invention relates to a method for determining boundary hypersurfaces from data matrices. The invention further relates to a device for determining boundary hypersurfaces from data matrices.

BACKGROUND

In many technical fields and in research, measurements are obtained as a function of various parameter values. In this context, individual, a plurality or all of the parameters on which the measurement value depends are varied in succession, and the average measurement value is determined as a function of the respective set of parameters. So as not to allow the measurement period to increase excessively, some parameters—in particular the parameters which only have a slight influence and/or are irrelevant in the respective field of application—are kept at a fixed value and not varied. If for example n parameters are varied, an n-dimensional value matrix is obtained. In this context, each determined measurement value is stored in the respective matrix element.

So as to be able to set up analytical and/or numerical models using the (raw) measurement values obtained in this manner or to be able to put in place further calculations, it is generally necessary initially to convert these (raw) data into a different format. A conversion which is often used in this connection involves determining boundary contours (in two dimensions a boundary line, in three dimensions a boundary surface) which form a boundary between measurement values below a particular value and measurement values above this particular measurement value.

A particularly clear application for determining boundaries of this type, which is commonly made use of in practice, occurs in relation to image data which are obtained for example by tomography methods (although the type of image generation is irrelevant; for example, image values may be obtained using X-rays, nuclear spin methods or ultrasound methods). Tomography methods of this type are used in a wide range of technical fields.

Perhaps the best known and most widespread application for this is in the field of medical technology. In this context, the measurement values obtained represent particular material properties (especially tissue properties), such as the density of the tissue. In this context, the measurement values are typically obtained in three dimensions. The data can subsequently be represented for example in the form of greyscale representations. Using greyscale representations of this type, it is possible for example to distinguish different tissue regions from one another (for example organs, bones, cysts, tumours, air-filled cavities and the like). However, if the data obtained are in particular to undergo further automated processing and/or be used for purposes other than simple observation, it is often necessary to carry out automated calculation of the boundary surfaces (in the case of three-dimensional data), with as little user intervention as possible.

In the prior art, what is known as the "marching cubes algorithm", developed in the mid-eighties by W. E. Lorensen and H. E. Cline, is made use of for this purpose (see W. E. Lorensen and H. E. Cline, "Marching Cubes; A High Resolution ED Surface Construction Algorithm", Comput. Graph. Vol. 21 (1987), pages 163-169). This algorithm involves successive migration through the three-dimensional grid. If the algorithm establishes that for two mutually adjacent 3D grid points the respective measurement value is above the boundary value in one case and below the boundary value in one case, the algorithm concludes from this that a boundary surface should be arranged here. This determination, as to whether and if applicable where a boundary surface should be arranged, is carried out from a (varying) central grid point in relation to all of the surrounding grid points. With the "collected" knowledge as to in which corner regions or edge regions a boundary surface is to be arranged, the most suitable base boundary surface arrangement (in other words the most suitable "template") is selected from a set of base boundary surface arrangements (known as "templates"). This check is carried out for all of the grid points in succession. Subsequently, the base boundary surface arrangements determined in this manner are interconnected to give complete boundary surfaces.

Even though the "marching cubes" algorithm often determines helpful boundary surfaces in practice, there are noticeable and significant problems with it. A first problem involves selecting the set of "templates". If this set is selected to be too large, the algorithm generally requires too much calculating time. Moreover, template sets of this type rapidly become confusing, and templates are therefore easily "forgotten". A further problem with the "marching cubes" algorithm is that the surfaces obtained are generally not clear-cut and moreover often have holes—that is to say are not completely closed. This can in some cases lead to major problems in the further processing of the boundary surface data. This problem occurs in particular if a comparatively small number of base surface arrangements (templates) are used (for example for reasons of calculating time).

Even though it may still appear possible to implement and use a complete set of base surface arrangements for a program of this type for three-dimensional data, major problems are encountered as soon as four-dimensional data are involved (for example 3D data which vary over time). Accordingly, the "marching cubes" approach cannot de facto be generalised to general n-dimensional problems where n≥4 (or only with great difficulty).

So as to reduce (and ideally to prevent) the above-disclosed problems involving non-closed surfaces, a wide range of proposals for modifying the basic "marching cubes" algorithm have already been proposed. A summary of previous approaches may be found for example in the scientific publication "A Survey of the Marching Cubes Algorithm" by T. S. Newman and H. Yi in Computers & Graphics, Vol. 30 (2006), pages 854-879. Improvements to the "marching cubes" algorithm have been disclosed in the patent literature too, for example in U.S. Pat. No. 7,538,764 B2. Even though the improvements disclosed in the prior art to the original "marching cubes" algorithm provide considerable improvements, they generally still have drawbacks, in some cases serious drawbacks. In particular, in the algorithms known in the art, the problem of non-closed boundary surfaces is generally still present, in particular when there are particularly unfavourable measurement value distributions.

SUMMARY

In an embodiment, the present invention provides a method for determining boundary hypersurfaces from data matrices including identifying intermediate hypersurfaces, situated between two respective matrix elements, that correspond to at least a portion of at least one boundary hypersurface to be determined. The identified intermediate hypersurfaces are represented by points that are adjacent to the intermediate hypersurfaces. The points that are adjacent to the intermediate hypersurfaces are connected by at least one respective closed curve. Hypersurface components formed by the closed curves are combined to form at least one boundary hypersurface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
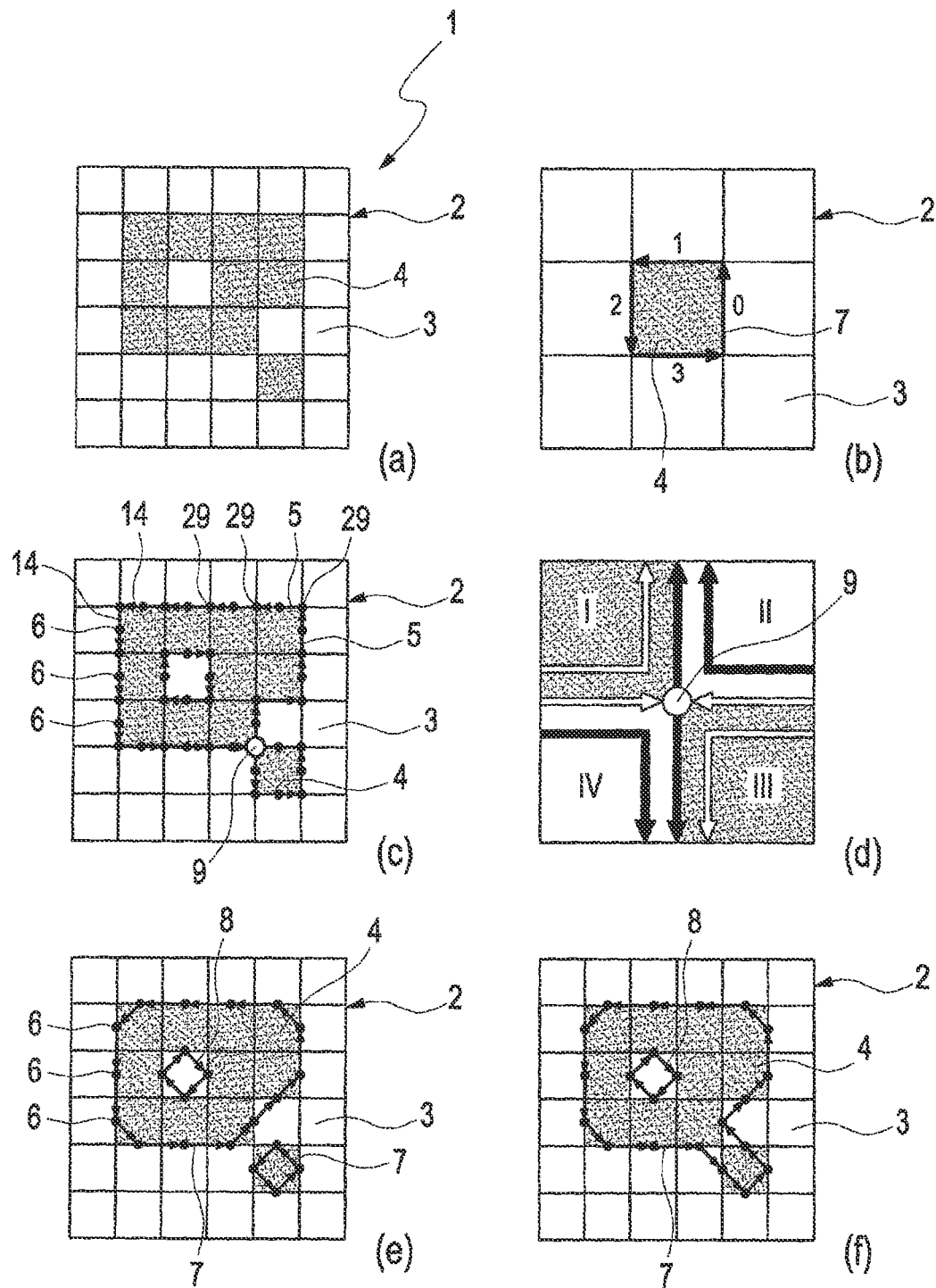
FIG. 1 shows an embodiment for the construction of boundary lines in two dimensions.

An aspect of the invention provides a method for determining boundary hypersurfaces from data matrices which is improved over known methods. A further object of the invention is to propose a device which is improved over known devices for determining boundary hypersurfaces from data matrices.

It is proposed to carry out a method for determining boundary hypersurfaces from data matrices having the following steps:

identification of the intermediate hypersurfaces, situated between two respective matrix elements, that correspond to at least a portion of at least one boundary hypersurface to be determined;

representation of the intermediate hypersurfaces identified in this manner by points that are adjacent to intermediate hypersurfaces;

connection of the points that are adjacent to intermediate hypersurfaces by at least one respective closed curve;

combination of the hypersurface components formed by the closed curves to form at least one boundary hypersurface.

Generally, data matrices are in the form of regular grids, such as in particular square, cubic etc. grids (using the corresponding, preferably regular geometric patterns in n dimensions). However, it is also perfectly conceivable to use other data structures, such as in particular irregular grids or grids having different coordinates (for example spherical coordinates, cylindrical coordinates and the like or the n-dimensional equivalents thereof). In principle, it does not matter how many dimensions the data matrix has. It is also possible for the data matrix to have different dimensions in portions, for example to have a dimension of n in some sub-regions and a dimension of n+1 or the like in other sub-regions. Further, the density of individual points in the data matrix may also vary, in such a way that for example there is a higher and/or lower density of measurement values in individual sub-regions. The intermediate hypersurfaces may in particular be identified in such a way that it is checked whether there is a "jump" over the respectively (locally) applicable boundary value between the respectively adjacent matrix elements. For example, there may thus be a value above the (locally) applicable boundary value in one matrix element whilst the value in the adjacent matrix element is below the (locally) applicable boundary value. Accordingly, an intermediate hypersurface is to be provided between the two matrix elements. By contrast, if there is no "jump" between two adjacent matrix elements, as a matter of basic principle no intermediate hypersurface is arranged there. Accordingly, the number of intermediate hypersurfaces per matrix element may vary. In particular, the number may be between zero and four in two dimensions, between zero and six in three dimensions, between zero and eight in four dimensions, and between zero and ten in five dimensions (and generally between 0 and 2n intermediate hypersurfaces in n dimensions). In this context, the (geometric) position of the intermediate hypersurface is irrelevant, at least initially. An arrangement which is particularly advantageous in terms of manageable calculation is generally provided by an (initially) central arrangement of the intermediate hypersurface between the two respectively adjacent matrix elements. In mathematical terms, the boundary hypersurface is generally a manifold of co-dimension 1. Accordingly, this is generally a line in two dimensions, a surface (for example a square) in three dimensions, a volume (for example a cuboid, cube or the like) in four dimensions, a tesseract in five dimensions etc. In the following, the intermediate hypersurfaces identified in this manner are represented by points that are adjacent to intermediate hypersurfaces. In this context, "adjacent to the intermediate hypersurfaces" may in principle mean basically any expedient type of arrangement of the relevant points with respect to the respective intermediate hypersurface. In particular, the respective points may be positioned substantially on (in particular centrally on) a connecting line between the two adjacent matrix elements (in particular the centres thereof). Some "lateral" variations are of course conceivable, but should preferably not be any greater than would correspond to the extension of the respective matrix element. Subsequently, the points that are adjacent to intermediate hypersurfaces are connected by at least one closed curve in each case. The type of line path (initially) basically does not matter. Even though a direct connection may be particularly expedient, it may also be found to be advantageous if there is at least initially a connection along the boundary edges (in three dimensions; in other dimensions optionally the respectively associated geometric structure). Subsequently, it is possible (but not compulsory) to carry out further optimisation on the respective connection lines. Subsequently, the hypersurface components (advantageously already optimised at this time) which are formed by the closed curves are combined to form at least one boundary hypersurface. Depending on the type of data involved, there will be a single (closed) boundary hypersurface or a plurality of (closed) boundary hypersurfaces. If for example there are two separately positioned tumour regions in three dimensions, it is naturally expedient to calculate two mutually independent boundary hypersurfaces which are closed per se. Moreover, mutually "separate" boundary hypersurfaces may also occur if these are in contact with one another in a lower dimension. Thus, in three dimensions for example it is also possible to refer to mutually separated boundary hypersurfaces even if they touch at a point and/or along a line. This is also applicable analogously to lower-dimension or higher-dimension spaces. A major advantage of the proposed method is that in practice no basic assumptions have to be made. In particular, it is not necessary to provide a set of base hypersurface element arrangements (known as "templates"). Accordingly, the algorithm is particularly robust (nearly always resulting exclusively in completely closed surfaces which do not have any holes), and is moreover particularly simple to generalise to higher dimensions, such as in particular four dimensions, five dimensions, six dimensions and the like.

In the method, it is preferred for the points that are adjacent to intermediate hypersurfaces to be, at least in part and/or at least at times, arranged centred on the intermediate hypersurfaces and/or included in the intermediate hypersurfaces in at least one step, preferably in at least a first step. A method of this type is generally found to be particularly simple to implement and moreover nearly always to be comparatively fast. Since the points that are adjacent to intermediate hypersurfaces, the curves connecting these points, the resulting hypersurface components and/or the resulting boundary hypersurfaces (and optionally also other elements) can furthermore be optimised in a later step, this need not lead to worsening of the end result. In this context, an arrangement centred on the intermediate hypersurfaces may mean an arrangement along a line connecting the centres of the corresponding mutually adjacent matrix elements or an arrangement positioned adjacent to this. An arrangement included in the intermediate hypersurfaces may in particular mean an arrangement of the respective point on or adjacent to an intermediate hypersurface (in other words for example a surface in three dimensions and a volume in four dimensions).

In the method, it is further advantageous for at least one closed curve and/or at least one hypersurface component to be optimised, in particular reduced, particularly preferably locally minimised, at least at times and/or at least in part. With optimisation of this type, an improvement which is nearly always noticeable in the final boundary surface(s) can be achieved using comparatively simple and/or computationally non-intensive algorithms. The proposed method thus generally produces noticeably better results.

A further advantageous embodiment of the proposed method is provided if at least one point that is adjacent to intermediate hypersurfaces and/or at least parts of at least one curve connecting points that are adjacent to intermediate hypersurfaces and/or at least one hypersurface component and/or at least one part of at least one boundary hypersurface are placed and/or displaced as a function of the data values of the adjacent data matrix elements. By means of an embodiment of this type of the method, the position of the boundary hypersurface can generally be determined even more precisely, by a considerable amount. Purely by way of example, if for a first measurement value of 51%, a second measurement value of 20% and a boundary value of 50% (resulting in a 50% boundary hypersurface) the final boundary surface is placed precisely midway between the two mutually adjacent matrix elements, this is nearly always less good than if the boundary hypersurface is located close to the centrepoint of the matrix element having the 51% measurement value. So as to make quantitative displacement possible, basically any known interpolation methods may be used (it also being possible to make use of further data values of matrix elements located nearby), such as linear interpolation, quadratic interpolation, cubic interpolation, spline interpolation and the like.

It is further proposed to carry out the method in such a way that at least one closed curve, preferably a plurality of closed curves, in particular at least substantially all of the closed curves, are directionally orientated and/or bounded by vector-like boundaries at least at times and/or at least in part. Using directional orientation of this type, it is simpler to combine hypersurface components into boundary hypersurfaces. Moreover, using the directional orientation it is possible to decide on an internal and external region (with respect to the complete boundary hypersurface). In this context, an internal region may be a region where the data values are above the boundary value, the data values accordingly being below the boundary value in the external region (or vice versa). In this context, it is also perfectly possible to provide directional orientation in a plurality of directions. Thus, for example, it is possible for a connecting line in the form of a pair of mutually antiparallel vectors to be "directionally orientated". It is also possible for the directional orientation (in particular the precise nature and implementation of the directional orientation) to be dependent on the respective method step and to vary over the course of the method (possible even repeatedly).

A further advantageous development of the method is achieved in that the boundary value which determines the arrangement, at least at times and/or at least in part, of at least part of at least one boundary hypersurface is variable at least at times and/or at least in regions, in particular variable by the user, and/or in that the treatment of at least parts of at least two mutually adjacent boundary hypersurfaces is variable, in particular variable by the user, at least at times and/or at least in regions. With a development of this type, the proposed method can be used particularly universally. The size of a boundary value which is to be selected at least in sub-regions and/or at least in particular time intervals can thus be adapted flexibly for example by a user of the method. In this case it is for example possible to "prepare" a tumour to be "better for calculation" by way of a correspondingly selected data value. The variation by the user may either be direct (for example by inputting a dedicated numerical value) or be transparent to the user in that he selects for example "bone display", "tumour display" and the like. The type of treatment of adjacent boundary hypersurfaces means in particular whether for example bodies which touch merely at one point or on one straight line (and optionally higher-dimensional bodies depending on the respective matrix dimension to be dealt with) are to be treated as interconnected bodies or mutually separated bodies. Accordingly, either two mutually separated boundary hypersurfaces or a single boundary hypersurface in the form of a "thin connecting neck" are thus formed. These numbers of one or two boundary hypersurfaces should of course be treated as purely exemplary.

It is further proposed for the method to have at least one method step in which at least one additional auxiliary structure can be inserted in at least one boundary hypersurface at least at times and/or at least in regions. This may for example take place if particular connection nodes which are "physically nonsensical", "medically nonsensical" or the like occur in the "almost finished" boundary hypersurface. In this case, these can subsequently be refined to be physically or medicinally "plausible" by inserting additional auxiliary structures (such as additional lines and the like). It is also possible for example to achieve a partial and/or optionally (substantially) complete reduction to particular geometrical base structures by inserting auxiliary structures of this type. For example, it may be found to be expedient to carry out a (partial and/or substantially complete and/or complete) reduction to triangles and/or tetrahedra (and/or corresponding higher-dimensional bodies), since structures of this type can for example be handled particularly well by graphics cards of electronic computers, and gains can therefore be made in terms of calculating time.

Moreover, in the method it is particularly expedient for a smoothing step to be carried out at least at times for at least part of at least one boundary hypersurface. As a result "physically nonsensical" and "medically nonsensical" (and the like) corners and edges can be prevented and a smoothed boundary hypersurface can be displayed. The result of the method can be further improved, in some cases considerably.

It is further proposed for the method to be carried out using a data matrix which is at least three-dimensional, at least four-dimensional, at least five-dimensional, at least six-dimensional, at least seven-dimensional and/or higher-dimensional at least at times and/or at least in part. In this context, the aforementioned values may be treated as discrete individual values, as lower boundary values and/or as upper boundary values. Thus, purely by way of example, a "purely four-dimensional" method or a four-to-six-dimensional method should be considered to be explicitly disclosed. Moreover, further "disclosed dimensions" are 8, 9, 10, 11, 12, 13, 14, 15, 16, 17, 18, 19 and 20. In particular four-dimensional data matrices are extremely expedient for many applications, since they are for example good for modelling three-dimensional spaces which vary over time. Higher-dimension values may also be found to be valuable, in particular in engineering, metrological and other technical applications as well as in (basic) research work. In this connection, relativistic hydrodynamic simulation calculations of freeze-out hypersurfaces for multi-particle production from fireballs in heavy ion collisions are one of many examples. Moreover, a further particularly promising field of application, in particular for four-dimensional methods, is the animated film industry, in which characters which vary over time in three-dimensional cartoons can be calculated.

In the method, it is particularly expedient for one of the dimensions of the data matrix to be time. In this case, an object which varies over time can be analysed in depth particularly well, and moreover, it is possible to calculate intermediate steps (in particular by interpolation methods) and predictions (in particular by extrapolation methods) in a particularly simple manner.

In the method, it is particularly advantageous for the data of the data matrix to be measurement values, in particular image values and/or physical measurement values, particularly preferably medical measurement values. In this case, the proposed method may be found to be of a particularly high relevance in practice.

A device, in particular a computer device, is proposed, which is configured and set up in such a way that it carries out a method of the type disclosed above, at least at times and/or at least in part. In particular, the device may be used for determining boundary hypersurfaces from data matrices. A device of this type may have the advantages and properties disclosed above at least in an analogous manner. Moreover, the device may be developed within the meaning of the present description (at least in an analogous manner).

To explain the proposed algorithm, the simplest case will initially be described, namely applying the method to measurement values which are in the form of a two-dimensional matrix. For example, this may be a two-dimensional computer tomography section through a tissue or through the body of a patient.

In this context, the algorithm is described in greater detail referring to the various pictures of FIG. 1. So as further to limit the description to the essential, only two different data values are used, namely "dark" and "light". An example of a data set of this type is shown in FIG. 1a. The 2D grid 2 of the image 1 can be seen, in which the different image points 3, 4, specifically the light image points 3 and the dark image points 4, are shown.

Initially, in a first method step, all "transition pairs"—at which there is therefore a contrast transition (transition from a light image point 3 to a dark image point 4 or vice versa) on the connecting line (not shown) of the two adjacent image points 3, 4—on the entire 2D grid 2 are determined. At contrast points of this type, an intermediate hypersurface 5 is accordingly provided in each case. This is shown in FIG. 1c. In the example presently shown, the intermediate hypersurfaces 5 are positioned precisely on the grid lines of the 2D grid 2. A positioning of this type is advantageous, but is not absolutely compulsory.

Algorithmically, all "transition pairs" can be detected for example by "running through" all of the image points 3, 4 "in succession". For this purpose, the image points 3, 4 may for example be "actuated" in succession in rows, while checking for the presence of "transition pairs" for each image point 3, 4 in a corresponding 2*2 image point neighbourhood. Starting from a particular image point 3, 4, a 2*2 image point neighbourhood is defined for example by the "starting image point", the right-hand neighbour thereof, the upper neighbour thereof and the upper-right neighbour thereof. Since conventionally only "direct transition pairs" (and not "diagonal transition pairs") are used for the continuing method sequence, it may also be sufficient, for each individual image point 3, 4, merely to check for the presence of a contrast transition from the respective right-hand and upper image point neighbours 3, 4. By way of the proposed mode of operation, the number of image point combinations to be checked can be greatly reduced, and this can help to save calculating time.

Subsequently, in a second method step, for the individual intermediate hypersurfaces 5 the corresponding auxiliary points 6 are determined (see FIGS. 1c and 2e). In the presently shown embodiment, the auxiliary points 6 are in each case arranged in the centre of the grid edges of the 2D grid 2 or in the centre of the respective intermediate hypersurfaces 5. This positioning corresponds to an arrangement in the centre of the connecting line between every two matrix element centres of respectively adjacent matrix elements (in other words image points 3, 4, auxiliary points 6 only occurring between matrix elements having a contrast transition). Subsequently, the auxiliary points 6 determined in this manner are each connected to form closed auxiliary curves 14. The auxiliary curves 14 are passed through the connecting points 29 at which the individual intermediate hypersurfaces 5 touch one another. In the case shown, the closed auxiliary curves 14 correspond to a sequence of the intermediate hypersurfaces 5. As will be discussed again in greater detail below, in the example shown in FIG. 1c, depending on the selected mode, a total of three closed auxiliary curves 14 (in the "separation mode" FIG. 1e) or merely two closed auxiliary curves 14 (in the "connection mode"; FIG. 1f) are obtained.

As can further be seen in FIG. 1c, the closed auxiliary curves 14 are each provided with a directional orientation. From the orientation of the auxiliary curves 14, it can thus be determined whether the image points 3, 4 positioned inside the auxiliary curve 14 are dark image points 4 or light image points 3. In the presently shown embodiment, the direction convention is selected in such a way (see also FIG. 1b) that a closed auxiliary curve 14 extending anticlockwise includes dark image points 4 in the interior thereof (light image points 3 accordingly being positioned outside the auxiliary curve 14 extending anticlockwise). By contrast, if the closed auxiliary curve 14 is directed clockwise, this means that light image points 3 are arranged in the interior of the closed auxiliary curve 14 extending clockwise (and accordingly there are dark image points 4 outside the closed auxiliary curve 14 extending clockwise). It is noted that the direction convention is selected arbitrarily and can perfectly well be selected differently.

Further, it is also perfectly possible for further auxiliary curves 14 to be included inside an auxiliary curve 14. Accordingly, it is possible for dark image points 4 to be positioned inside a closed auxiliary curve 14 extending anticlockwise, in the "proximate region" to the auxiliary curve 14, whilst there are light image points 3 again in a further "inner" auxiliary curve 14, positioned inside the "outer" closed auxiliary curve 14 and having a direction extending clockwise. These "substructures" may also be nested repeatedly. A simple example of "substructures" of this type is shown in FIG. 1 (in particular FIG. 1c).

The auxiliary curves 14 are subsequently optimised in that the auxiliary points 6 (optionally after positional correction) are directly interconnected, in other words the connecting points 29 are omitted. This leads to the length of the auxiliary curves 14 being minimised (local minimum in each case), ultimately resulting in the closed curves 7, 8 shown in FIG. 1e. The closed curves 7 are directed anticlockwise, and thus contain dark image points 4 in the interior thereof. Accordingly, the closed curves 8 are directed clockwise, and thus contain light image points 3 in the interior thereof.

A further special case occurs if two sets of image points (two sets each consisting of dark image points 4 in the embodiment shown in FIG. 1c) touch at merely a single contact point 9. In this case, it may be expedient for the respective sets of image points 4 to be treated as separate sets (ultimately resulting in the total of three closed curves 7, 8 shown in FIG. 1e). However, it may also likewise be expedient to treat the sets of image points which touch at a single contact point 9 to belong together, ultimately resulting in the situation shown FIG. 1f, in which merely two closed curves 7, 8 are produced by the algorithm. It is advantageous for the decision as to whether sets of image points of this type should be treated as cohesive or as separate from one another to be left to the user, as explained above. Said user may for example define what actions should be taken in a case of this type before the closed curves 7, 8 are constructed (for example by selecting a corresponding button on a computer screen).

Contact points 9 of this type are identified and handled using the logic shown in greater detail in FIG. 1d. For this purpose, the initial auxiliary curves (corresponding to the interconnected intermediate hypersurfaces 5) are preferably already provided with a directional orientation (same convention as the directional orientation of the closed curves 7, 8; see FIGS. 1b, 1c, 1e, 1f). Following the sequence of the auxiliary curves 14 or the directed intermediate hypersurfaces 5, an auxiliary curve 14 or an intermediate hypersurface 5 having the opposite direction is encountered at a contact point 9 (see FIG. 1d). If the setting is such that sets of points which touch at a single contact point 9 are to be combined (FIG. 1f), there is a deflection "to the right" in quadrant IV. By contrast, if the sets of points are to be separated from one another, there is a deflection "to the left" in quadrant I. The same applies when coming from the direction of quadrant II/III.

Referring to FIGS. 2 to 6, the application of the proposed method in the case of three-dimensional data will be explained.

Figure 2:
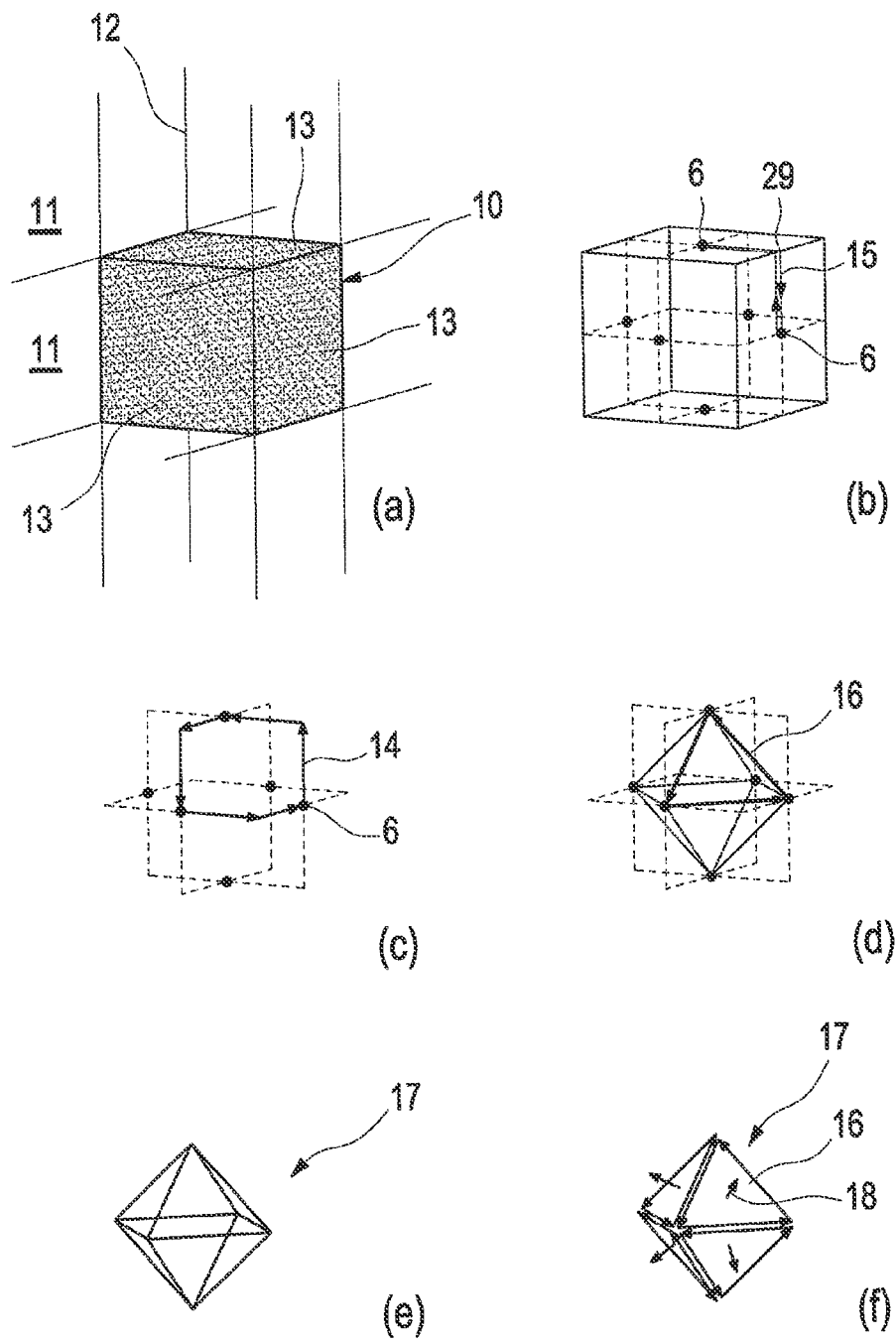
FIG. 2 shows an embodiment for the construction of a boundary surface in three dimensions.

For simplicity, FIG. 2 shows a single 3D volume element 10 (known as a voxel), embedded in a 3D grid 12 which is merely sketched in. The voxel 10, which is cubic in this case, is a dark voxel 10 which is enclosed by exclusively light voxels 11. The dark voxel 10 thus contacts an adjacent (light) voxel 11 at each of a total of six faces 13. The initial relationships are shown FIG. 2a. Since this is a single dark voxel 10 in the middle of otherwise exclusively light voxels 11, it has to be completely enclosed by a boundary hypersurface 17 after the algorithm is run (cf. FIG. 2f).

Since there is a contrast (between dark and light) between the dark voxel 10 shown and each of the light voxels 11 surrounding it, an intermediate hypersurface 13 is to be arranged between the dark voxel 10 and each of the six surrounding light voxels 11. In this case, said hypersurface is identical to the faces 13 of the cubic voxel 10 or the faces 13 of the 3D grid 12.

In this context—similarly to what was explained previously in two dimensions—the contrast transitions can be identified by passing through all of the voxels 10 of the data matrix in succession, the presence of contrast transitions being searched for in a 2*2*2 neighbourhood in each case.

Subsequently, in a further step, an auxiliary point 6, centrally arranged in each case in the embodiment shown, is assigned to each of the faces 13. These auxiliary points 6 are in turn interconnected by a plurality of auxiliary curves 14, which are each closed per se. Of these auxiliary curves 14 which are closed per se (each "assigned" to the cubic voxel 10), and of which there are a total of eight in the embodiment shown, only one auxiliary curve 14 is shown in FIG. 2c for reasons of clarity (the other auxiliary curves 14 "framing" the remaining corners of the voxel 10). As can be seen from FIG. 2c, the auxiliary curve 14 is selected in a directionally orientated manner, applying the direction convention used previously in two dimensions. The direction indicates that the dark voxels 10 are located inside and the light voxels 11 are located outside. The closed auxiliary curves 14 can be generated with particularly simple programming in that the auxiliary points 6 are in each case interconnected by a connecting line 15 (see FIG. 2b, where for reasons of clarity only a single connecting line 15 is provided in greater detail), and this connecting line 15 is represented in the form of mutually antiparallel vectors ("double vectors") (the other connecting lines 15 extend through the remaining side edges of the voxel 10). An auxiliary curve 14 which is closed per se is then generated by placing direction vectors having the same directionality in sequence.

In a further step, the auxiliary curves 14 are subsequently simplified in that the intermediate points on the side edges of the voxel 10 are removed from the curve path. This results in the triangle 16 visible in FIG. 2d. The triangle 16 produces a local minimum surface, in other words is locally minimised in terms of the surface area and perimeter thereof. Since not only the regions of the voxel 10 shown at the front right and top in FIG. 2 are processed by the algorithm, seven further triangles are generated aside from the triangle 16 shown in bold in FIG. 2d, and together form an octahedron 17 (or form an octahedral surface which encloses an octahedron 17). The octahedron 17 is shown in the form of a gridline model in FIG. 2e. In FIG. 2f, in addition to the simple grid model, the octahedron 17 is further shown together with the directional orientation shown in FIG. 2c of the auxiliary curves 14 (which is also maintained for the triangles 16). On the basis of the peripheral direction of the individual triangles 16, normal vectors 18, in other words directionally orientated surface perpendiculars (surface normals), can be defined for each triangle 16. These result in the "inside" and "outside" of the boundary hypersurface, thus in this case of the octahedron 17.

Figure 3:
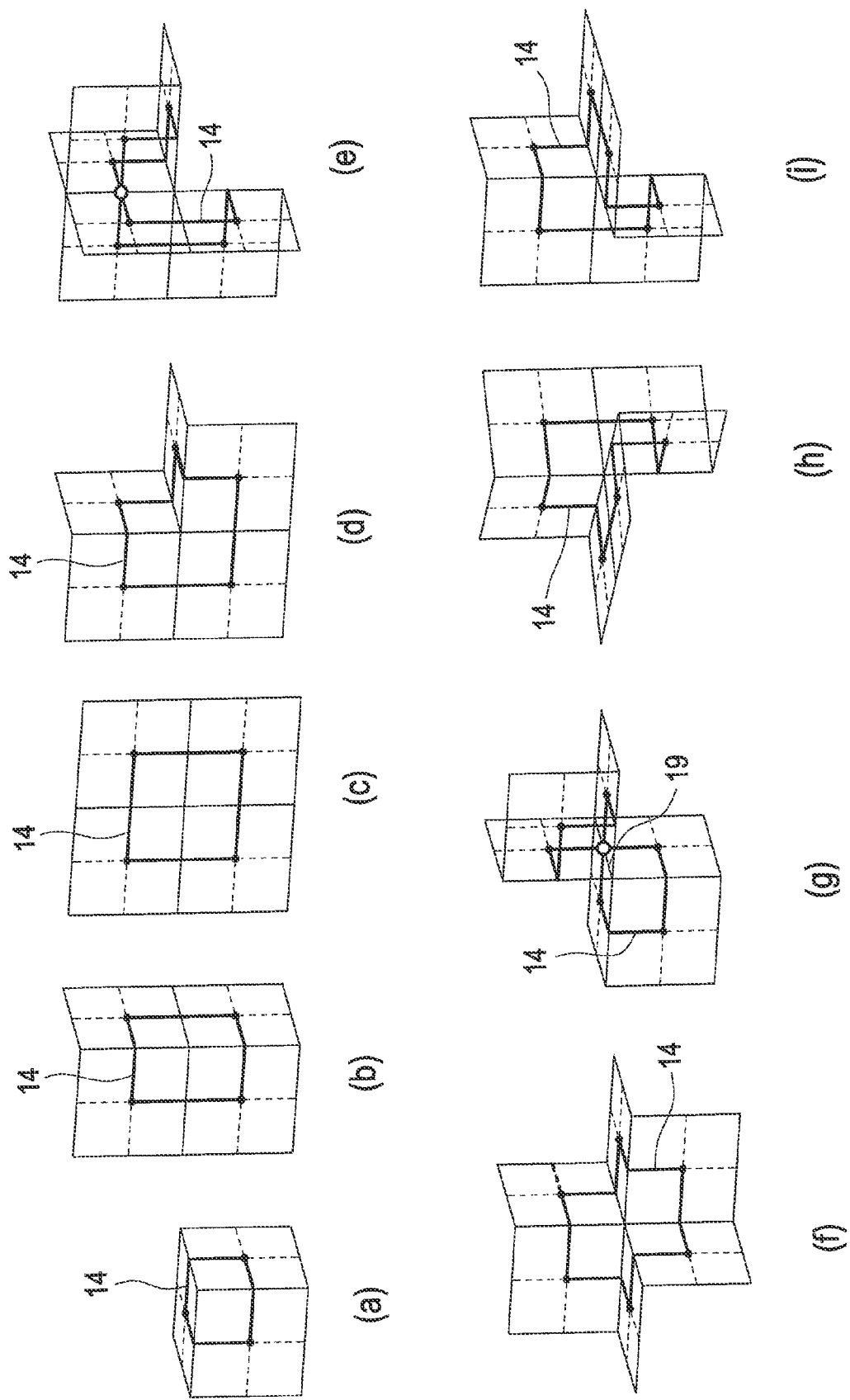
FIG. 3 shows examples of different types of initial contact faces for different voxel data value arrangements in three dimensions.

In general, of course, more complex data arrangements than the arrangement shown in FIG. 2 need to be processed by the proposed algorithm. In FIG. 3, purely by way of example, the intermediate results corresponding to FIG. 2c are shown for some arrangements of dark voxels 10 and light voxels 11 (merely the boundary faces at which there is a contrast transition being shown in FIG. 3). In this context, for some of the topologies shown this results in configurations similar to the single contact point 9 in FIG. 1c. This is the case in FIGS. 3e and 3g. Since this is now a problem one dimension higher, it is expedient not to provide the possibility of (optionally) connecting or separating mutually contacting sets of light voxels 11 and dark voxels 10 when these sets merely contact one another at a single point, but only when two sets of the same type contact one another along a line. This is the case in FIG. 3e, where at the front left there is a column of two overlapping dark voxels 10 and at the rear top right there is a single dark voxel 10. The "dark column" and the single dark voxel 10 contact one anther along a contact line 19, and this is shown by way of a circular line at the midpoint of the contact line 19 (the circular line is supposed to symbolise a possible alternative processing in a "separation mode" or in a "connection mode"). A situation of this type occurs in FIG. 3g, where two dark voxels 10 are arranged along a "diagonal" in such a way that in this case two a contact line 19 is generated. Purely for completeness, it is noted that FIG. 3 merely shows individual exemplary arrangements of dark 10 and light voxels 11.

Figure 4:
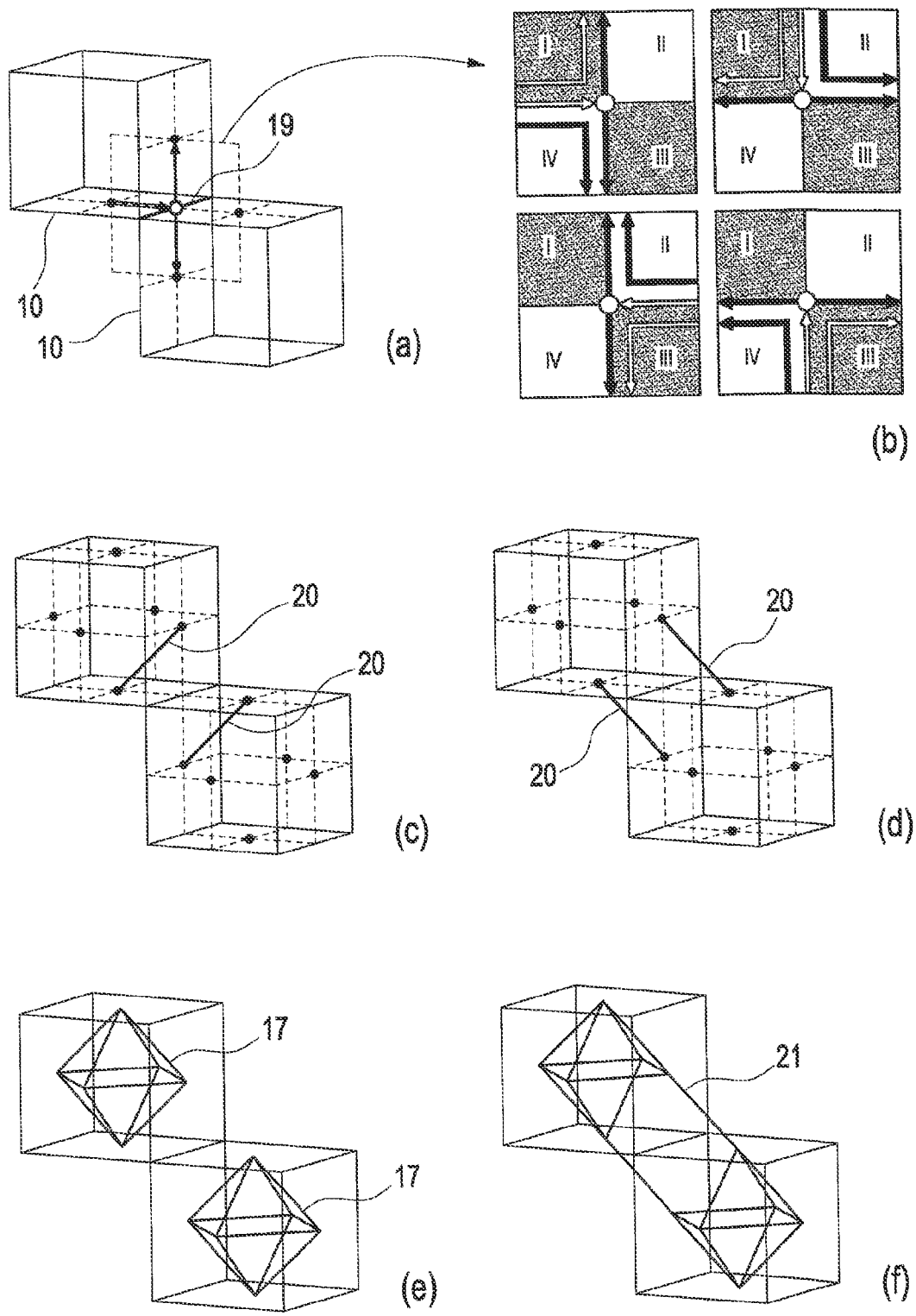
FIG. 4 shows examples of possible ways of processing volume regions which contact one another only along a line in three dimensions.

FIG. 4 explains in greater detail how the algorithm generates the resulting boundary hypersurfaces when there is a contact line 19. In accordance with the methods proposed herein, the two sets of dark voxels 10 (top left and bottom right in FIG. 4a) are separated or connected (for example depending on a user specification) during the reduction step when simplifying the auxiliary curves 14 (see transition from FIG. 2c to FIG. 2d). The "logic" used by the algorithm is shown in particular in FIG. 4b. FIG. 4b shows the handling of the different direction vectors (four drawings in total) in accordance with the situation shown in FIG. 4a. Depending on whether the "connection mode" or the "separation mode" is selected, either the elbowed white arrow (corresponding to the "separation mode") or the elbowed black arrow (corresponding to the "connection mode") is followed. Accordingly, in the "separation mode" this results in the boundary lines 20 shown in FIG. 4c and in the two mutually separated octahedra 17 (or octahedral surfaces FIG. 4e) or the boundary lines 20 shown in FIG. 4d and thus ultimately in the overall volume 21 shown in FIG. 4f (or the surface of the body shown in FIG. 4f).

Figure 5:
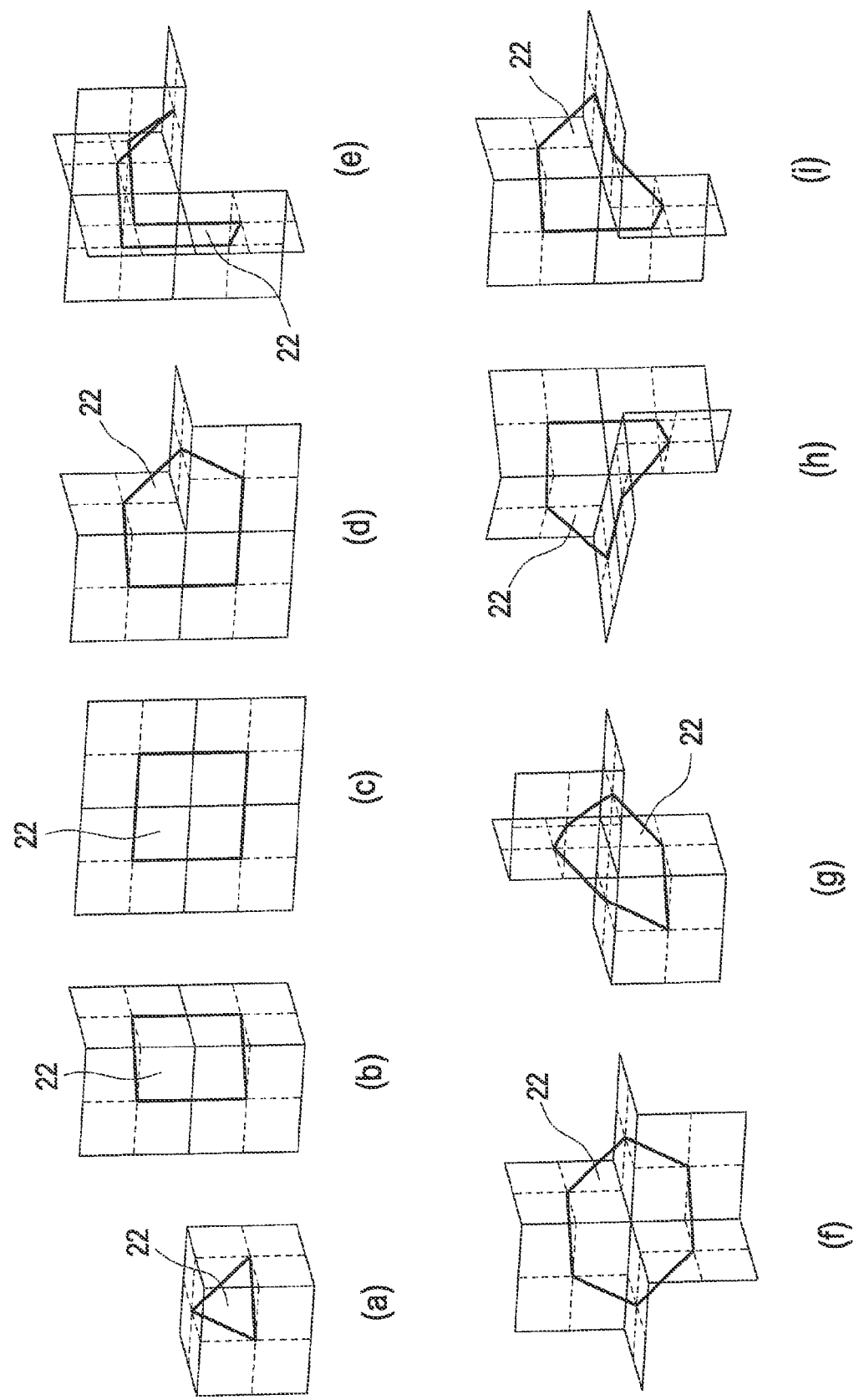
FIG. 5 shows the boundary surfaces illustrated in FIG. 3 in a possible optimised form.

Finally, FIG. 5 shows the topologies shown in FIG. 3 in a form after further processing, specifically after the auxiliary lines 14 have been simplified into surface components 22. This corresponds to the transition from FIG. 2c to FIG. 2d. In this context, the "connection mode" was used in the case of the topologies illustrated in FIGS. 3e and 3g.

Figure 6:
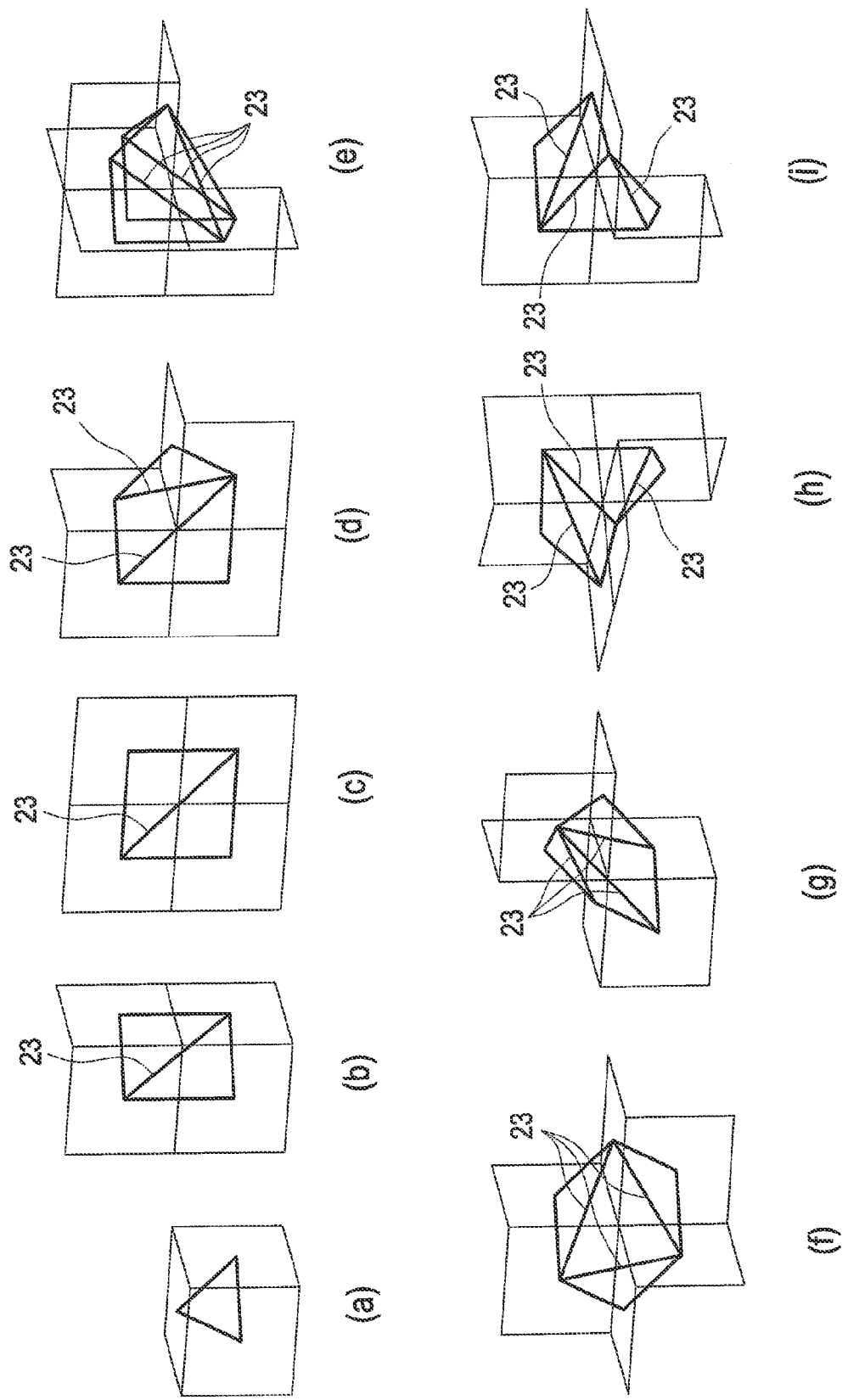
FIG. 6 shows the boundary surfaces illustrated in FIG. 5, said boundary surfaces being reduced to triangles.

A further processing option for the resulting hypersurface components 22—and thus ultimately for the overall hypersurface—involves reducing all of the faces to triangles by introducing additional auxiliary lines 23 (see FIG. 6). On the one hand, triangles of this type can generate a smoother and more homogeneous overall surface. A further advantage is in particular the option of further processing or visualisation of the data on an electronic computer, since modern graphics cards can be addressed in a particularly simple manner using a number of individual triangles, the graphics card itself calculating the spatial positioning and the resulting light, colour and other spatial effects. The central processor (CPU) can thus be unburdened considerably and/or the results can be visualised much more rapidly. In between, it may be found to be expedient for parts of the calculations required for the method to be shifted from the CPU (central processor) to the GPU (graphics processing unit).

Figure 7:
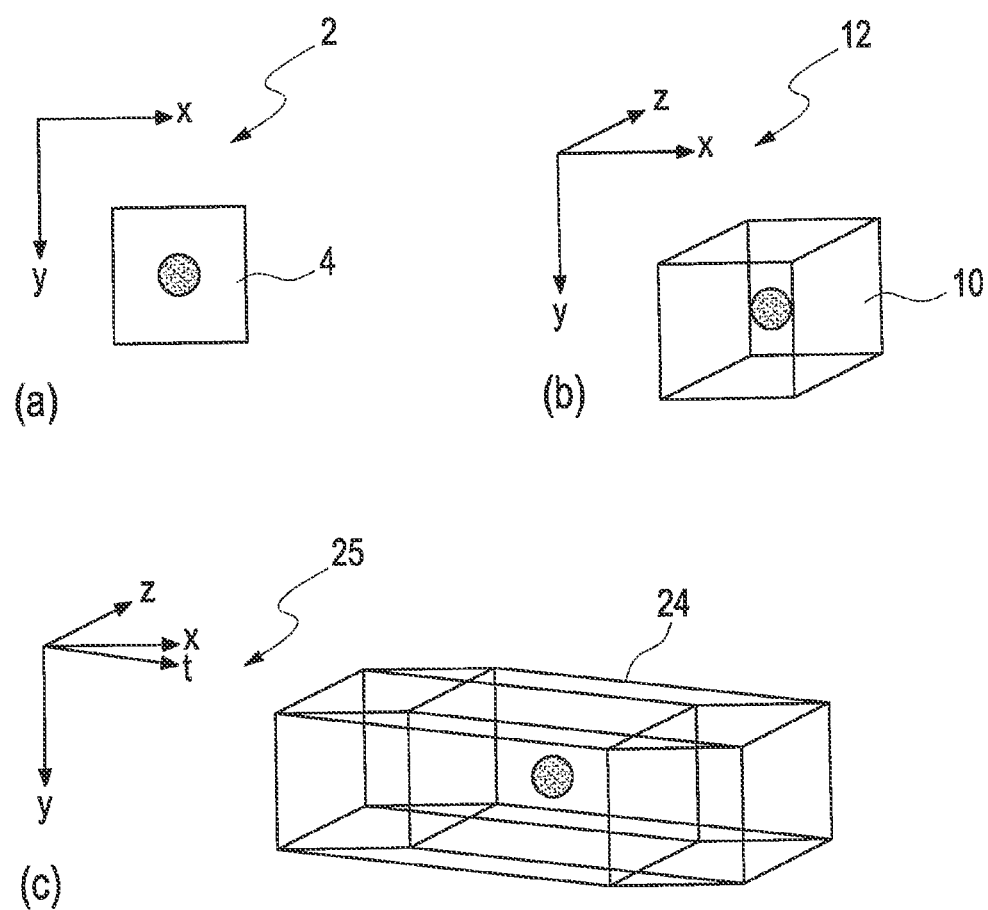
FIG. 7 shows different coordinate systems for two dimensions, three dimensions and four dimensions.
Figure 8:
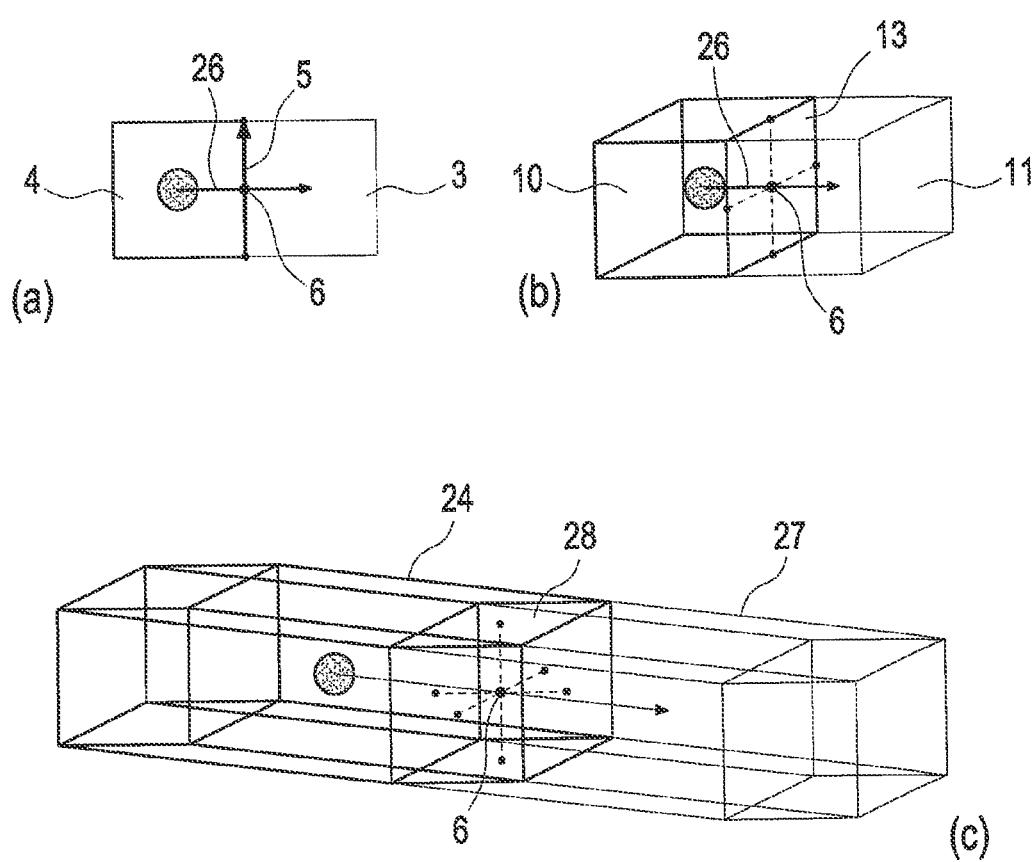
FIG. 8 shows the construction of auxiliary points and connecting points in accordance with an embodiment of an algorithm for different dimensions.
Figure 9:
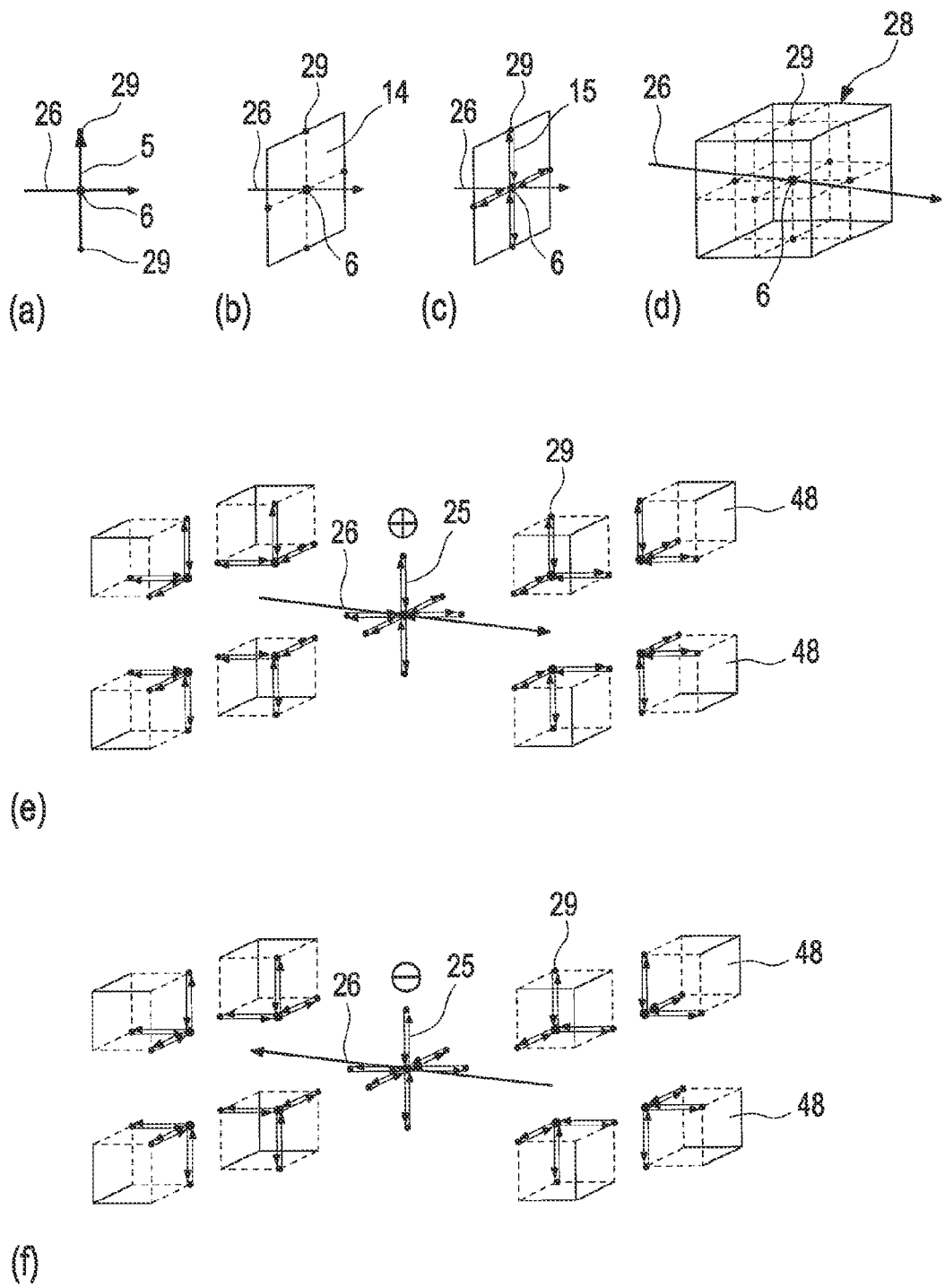
FIG. 9 shows the construction of connecting lines between connecting points in accordance with a preferred embodiment of an algorithm for different dimensions.

FIGS. 7 to 9 show the transition of the algorithm from two-dimensional through three-dimensional to four-dimensional data.

In FIG. 7, FIG. 7a shows a single dark image point 4 in a 2D grid 2. In FIG. 7b, a single dark voxel 10 can be seen in a 3D grid 12. Finally, FIG. 7c shows the analogous four-dimensional relationships, in other words a dark tesseract 24 (a "four-dimensional cube") in a four-dimensional grid 25. The axes of the four-dimensional grid 25 are labelled X, Y and Z for the spatial axes and t for the fourth dimension (for example time). The type of display of the tesseract 24 in FIG. 7c can be thought of as a voxel which varies over time. The representation of the tesseract in FIG. 7c is supposed to symbolise this variation of a voxel over time. As is known from mathematics, a two-dimensional object (in FIG. 7a a square) is delimited by one-dimensional objects, in this case by four lines. By contrast, a volume element (cubic voxel 10 in FIG. 7b) is delimited by surface elements, in this case by four squares. The four-dimensional tesseract in FIG. 7c is accordingly delimited by three-dimensional bodies, in this case by eight cubes.

FIG. 8 shows a preferred construction of intermediate hypersurfaces 5, 13 and auxiliary points 6 in two dimensions (FIG. 7a), three dimensions (FIG. 7b) and four dimensions (FIG. 8c). For reasons of clarity, the respective construction of the intermediate hypersurfaces 5, 13 and of the auxiliary points 6 is only shown in one position in each case.

In FIG. 8a, a contrast transition 26 represented by an arrow (arrow direction from "dark" to "light") is shown in a two-dimensional grid. In the case shown, the left image point is a dark image point 4, whilst the right image point is a light image point 3. The direction of the contrast transition arrow 26 goes from "dark" to "light". As explained previously in connection with FIG. 2, as a result of the contrast transition 26 an intermediate hypersurface 5 (in the present 2D case a line) is provided. The auxiliary point 6 is arranged in the centre of the 2D intermediate hypersurface 5.

The relationships in three dimensions are shown in FIG. 8b. The contrast transition 26 from a dark voxel (left of the image) to a light voxel 11 (right of the image) is likewise represented by a contrast transition arrow 26. An intermediate hypersurface 13 (in three dimensions a surface 13, in this case in the form of a square) is likewise arranged between the two different voxels 10, 11. A (centrally arranged) auxiliary point 6 is arranged in the centre of the intermediate hypersurface 13.

In a corresponding manner, in four dimensions (see FIG. 8c) an interposed intermediate hypersurface 28 is also provided between two different tesseracts 24, 27 (dark tesseract 24 and light tesseract 27) and in this case is in the form of an intermediate cube 28. Analogously to in two dimensions and in three dimensions, in four dimensions too an auxiliary point 6 is provided in the centre of the intermediate cube 28.

Subsequently, in FIG. 9, the construction of the auxiliary curves 5, 14 in different dimensions is explained. As is already known from the previously explained two-dimensional and three-dimensional cases, the auxiliary points 6 are used as starting points for the construction of the hypersurfaces (optionally in different method stages) which are to be generated. In two dimensions (FIG. 9a), the connecting points 29 are shown at which two intermediate elements 5 or (diagonally) adjacent grid elements touch one another in each case. In this context, the connecting vectors between two auxiliary points 6 to be interconnected are passed through the connecting points 29. In a further step, the connecting points 29 are removed (during an optimisation step), resulting in a direct connection between two adjacent connecting points 6 and thus optimising the resulting overall hypersurface.

FIGS. 9b and 9c show the relationships for three dimensions. In this case too, the auxiliary points 6 to be interconnected are interconnected via connecting points 29 using connecting lines 15 in the form of double vectors (see in particular FIG. 9). After the double vectors have been interconnected in each case to form closed auxiliary curves 14 (cf. FIG. 2c), "raw hypersurfaces" are present, which represent manifolds, already different, of inclusive curves, but expediently are further optimised.

The relationships in four dimensions are explained in greater detail in FIG. 9d to f. FIG. 9d shows an intermediate cube 28. In this case too, connecting lines 25 in the form of double vectors (see FIGS. 9e and 9f) are guided to the auxiliary points 6 of the adjacent intermediate cubes 28, starting from the auxiliary point 6 located in the centre, via the connecting points 29, of which there are six in four dimensions. FIG. 9e is an exploded drawing of the intermediate cube 28 shown cohesively in FIG. 9d, it being possible to see the total of eight intermediate cube eighths 48. In FIG. 9f, the direction of the contrast transition 26 is reversed with respect to FIG. 9e (the contrast transition arrow 26 points in the opposite direction). Therefore, in FIGS. 9e and 9f, a distinction is made between, one the one hand, the case marked "plus" (FIG. 9e), in which the contrast transition extends in the positive X, Y, Z or t direction, and, on the other hand, the case marked "minus" (FIG. 9f), in which the contrast transition 26 extends in the negative X, Y, Z or t direction. In four dimensions, there is a larger number of connecting lines 15.

The following discussion relates to an individual 2*2*2*2 toxel neighbourhood ("4D neighbourhood cell") within the four-dimensional grid, said neighbourhood likewise being represented by a tesseract in this case. In this context, a "toxel" is a four-dimensional hyper-volume element, thus corresponding to a voxel (in three dimensions) or a pixel (in two dimensions). Within a 4D neighbourhood cell, up to sixteen tesseracts may be either dark 24 or light 27. Thus, within a 4D neighbourhood cell, each of these sixteen tesseracts is only represented by one sixteenth of the total hypervolume of the 4D neighbourhood cell. Within a 4D neighbourhood cell, an individual tesseract 24, 27 thus has only four closest neighbours, with which it shares one eighth of an intermediate cube 28 (in other words one intermediate cube eighth 48) as a contact volume. In total, this results in 192 different paths on which the auxiliary points 6 are to be interconnected via intermediate connecting points 29.

Figure 10:
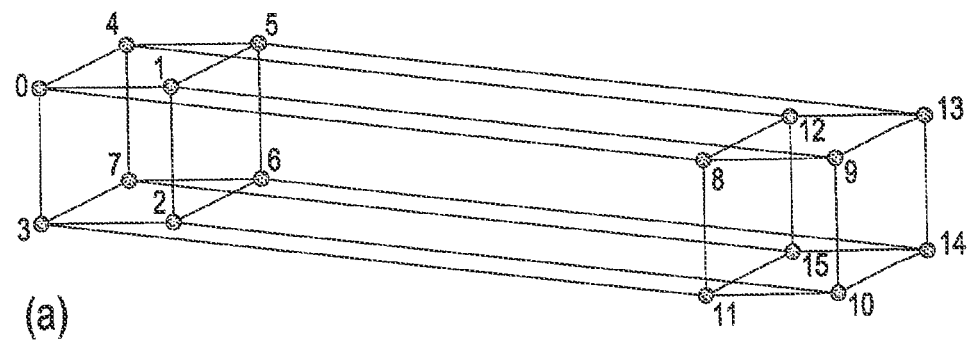
FIG. 10 shows the notation used in a 2*2*2*2 toxel neighbourhood for the different toxels, auxiliary points and connecting points in accordance with a four-dimensional embodiment.
Figure 10:
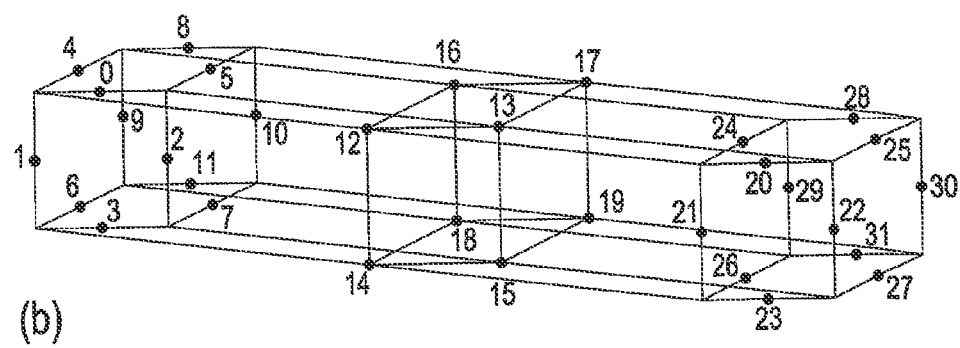
Figure 10:
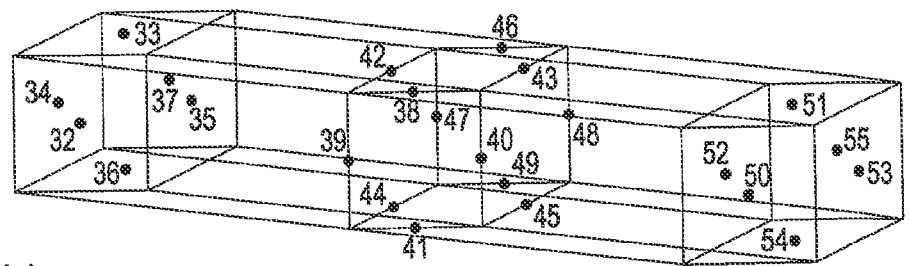
Figure 10:
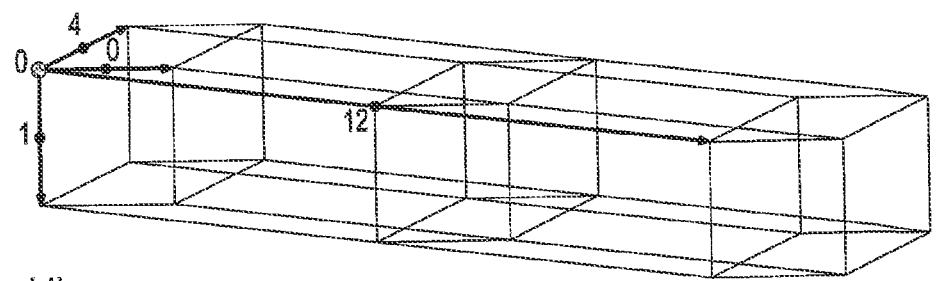

The possible triplets of different paths are listed in Table I. In this context, the notation explained in FIG. 10 is used. FIG. 10a initially shows an individual 4D neighbourhood cell (a four-dimensional grid element). A 4D neighbourhood cell of this type is obtained by proceeding from a particular toxel ("starting toxel") in one direction in each case out of the total of four spatial dimensions (but not in the respective counter direction). The sixteen individual toxels of this 4D neighbourhood cell are labelled with the numbers 0-15. In this context, the numbers from 0 to 7 inclusive denote the "past", whilst the numbers from 8 to 15 inclusive describe the "future". FIG. 10b shows, numbered in order, the auxiliary points 6 of the volumes (intermediate cubes 28) delimiting the individual toxels. These correspond to the column labelled "Center ID" in Table I. In turn, FIG. 10c shows the connecting points 29 for mutually adjacent intermediate cubes 28 along with the respective numbering thereof. The numbers used in the paths in Table I and the significance thereof may be derived in particular from FIGS. 10b and 10c. In FIG. 10d, by way of illustration, an example comprising four contrast transition vectors 26 is shown. In this context, by way of example, a toxel labelled with number "0", having a positive ("plus") orientation in the X, Y, Z and t directions, is arbitrarily singled out. In this context, the four contrast transitions 26 (in the X, Y, Z and t directions) are superposed using the auxiliary points 6, which are in a relationship with one another and are arranged in the centre of the connecting cube 28.

Figure 11:
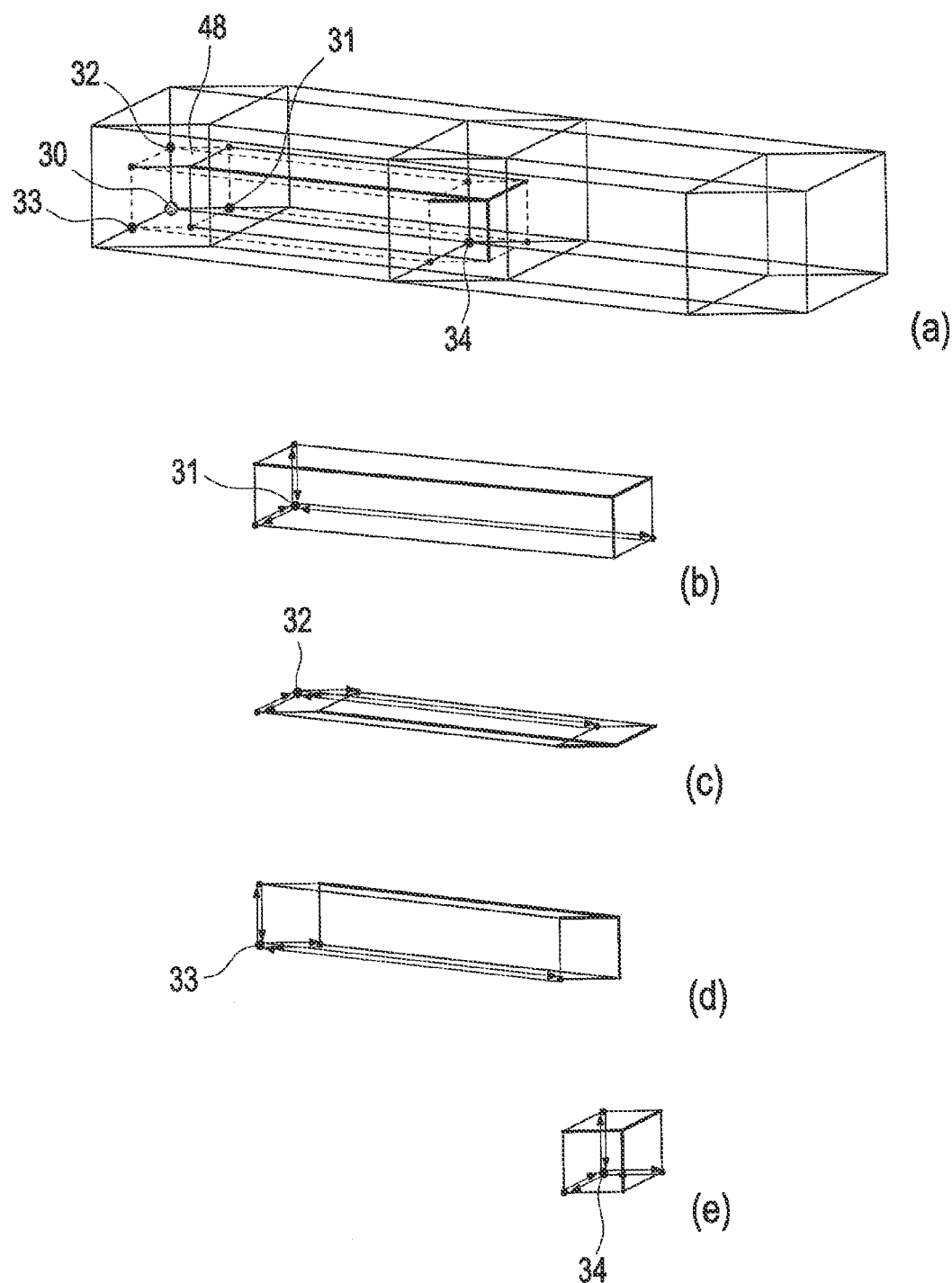
FIG. 11 is an illustration of the boundary volume of an individual toxel in a 2*2*2*2 toxel neighbourhood in accordance with an embodiment.

FIG. 11 shows the four boundary volumes 31, 32, 33, 34 (in other words, in the embodiment shown in this case, the eighths 48 of an intermediate cube 28) for an individual toxel labelled 7 (see FIG. 10a). FIG. 11a initially shows all four eighths 48 of an intermediate cube 28 (specifically the intermediate eighths 31, 32, 33, 34) within a 4D neighbourhood cell. FIGS. 11b, c, d and e show the individual eighths 48 of the intermediate cube 28 again individually in greater detail. FIG. 11b shows volume element number 11+ (denoted by reference numeral 31 in FIG. 11) in the positive X direction. FIG. 11c shows volume element number 9− (denoted by reference numeral 32 in FIG. 11) in the negative Y direction. FIG. 11d further shows volume element number 6− (denoted by reference numeral 33 in FIG. 11) in the negative Z direction, and finally FIG. 11e shows volume element number 18+ (denoted by reference numeral 34 in FIG. 11) in the positive t direction.

Figure 12:
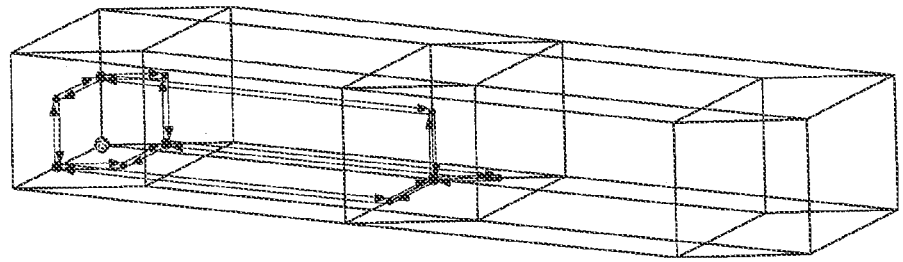
FIG. 12 shows the double vectors used for the example shown in FIG. 11 in accordance with an embodiment of the algorithm in a four-dimensional example environment.
Figure 12:
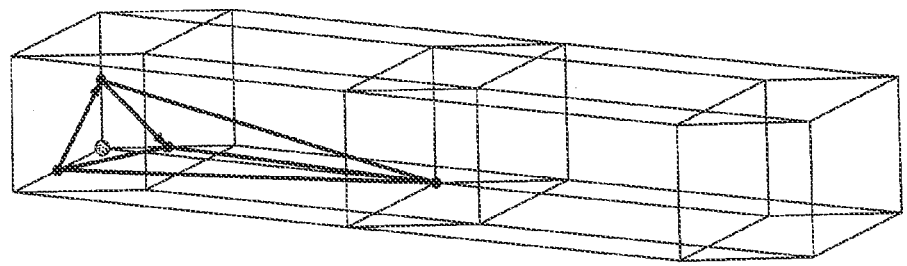
Figure 12:
Figure 12:
Figure 12:
Figure 12:

Finally, FIG. 12 continues FIG. 11, which was described above. FIG. 12a illustrates the four initial cyclic vector paths. These extend along the points 37→11→36→6→34→9→37, along the points 36→11→49→18→44→6→36, along the points 47→18→49→11→37→9→47, and along the points 34→6→44→18→47→9→34. In this context, it should be noted that all of the points having a number ≥32 are connecting points 29 which are deleted in an optimisation step. After this optimisation step, this ultimately results in the optimised cyclic vector path 11→6→9→11 shown in FIG. 12b (along with the tetrahedron embedded in the four-dimensional tesseract) for the first vector path, the optimised cyclic vector path 11→18→6→11 shown in FIG. 12c (including the resulting tetrahedron) for the second vector path, the optimised cyclic vector path 18→11→9→18 shown in FIG. 12d (including the optimised tetrahedron) for the third vector path, and the optimised cyclic vector path 6→8→9→6 shown in FIG. 12e (including the optimised tetrahedron) for the fourth vector path. FIG. 12f shows the optimised tetrahedron again in a drawing without any vector paths. For reasons of clarity, the edges have not been drawn in the form of antiparallel vectors (although these are still present as before).

Figure 13:
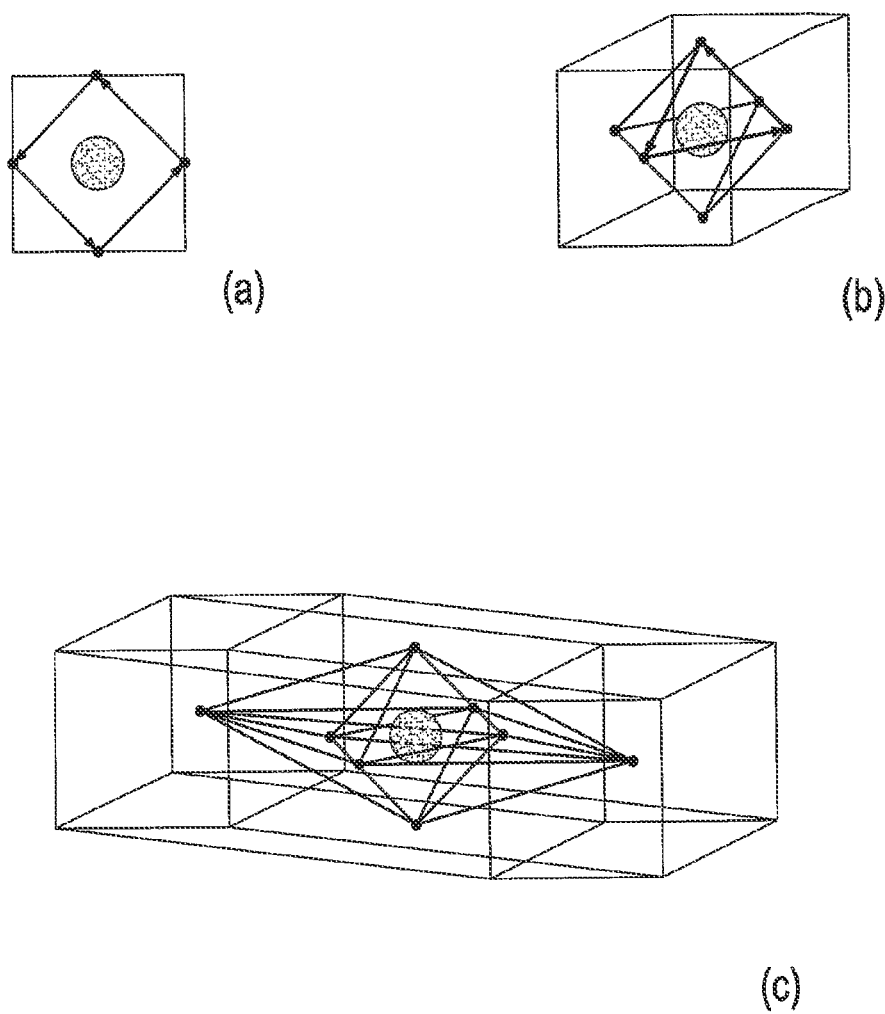
FIG. 13 shows embodiments of generated boundary hypersurfaces in systems having different dimensions.

Finally, this results in the boundary hypersurface shown in FIG. 13c, in the form of sixteen tetrahedra, since overall the proposed algorithm processes all possible positionings of an individual dark tesseract 24 which may occur within a 4D neighbourhood cell. In this context, the tetrahedra are vectorially directed, although this is not shown in greater detail for reasons of clarity. For comparison, FIG. 13 also shows the two-dimensional case (FIG. 13a) and the three-dimensional case (FIG. 13b).

In four dimensions too, the problem previously encountered in two and three dimensions still occurs as to how to proceed when dark regions 24 or light regions 27 do not contact one another in all n−1 dimensions (in other words only have an (n−2)-dimensional hypersurface and/or an even lower-dimension hypersurface in common; see FIG. 1c or FIG. 4). In four dimensions, in this context it is additionally possible to distinguish the cases where two adjacent toxel elements touch one another within a volume (in other words have a surface in common), touch one another along a surface (in other words have a line in common) or touch one another along a line (in other words have a point in common). Analogously to the three dimensional case, it is inexpedient to have two corresponding regions (in other words two light regions or two dark regions) defined as interconnected if they touch one another along a surface (line in common) or merely along a line (point in common) in four dimensions.

Figure 14:
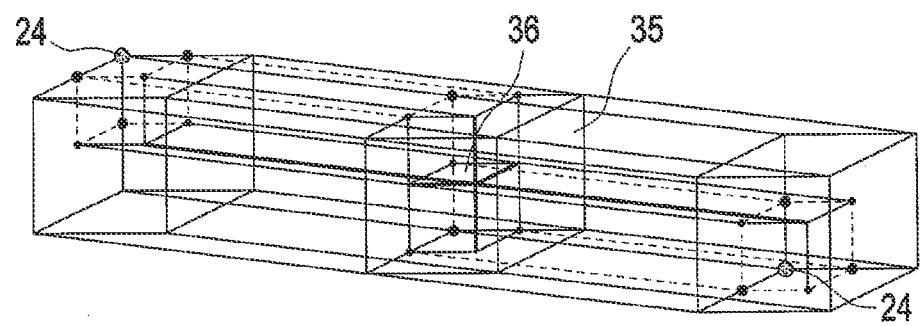
FIG. 14 shows an embodiment of possible ways of handling four-dimensional regions of the same type which only contact one another along a surface.
Figure 14:
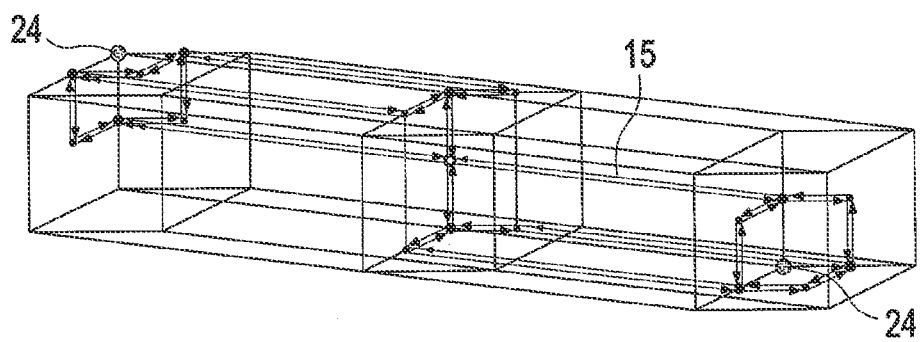
Figure 14:
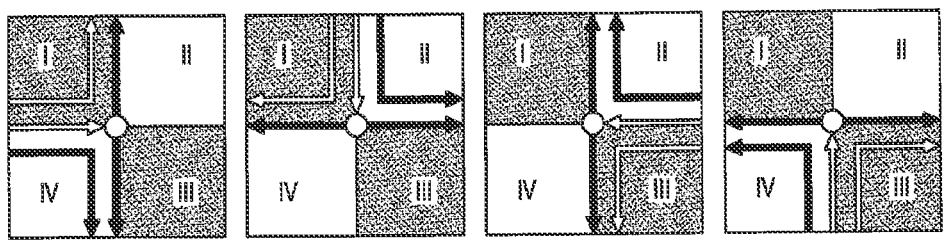
Figure 14:
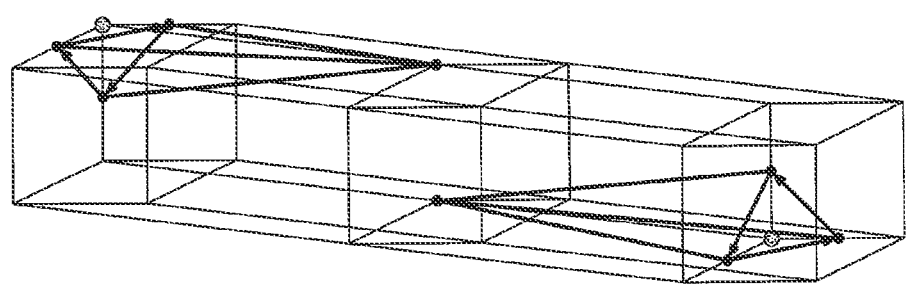
Figure 14:
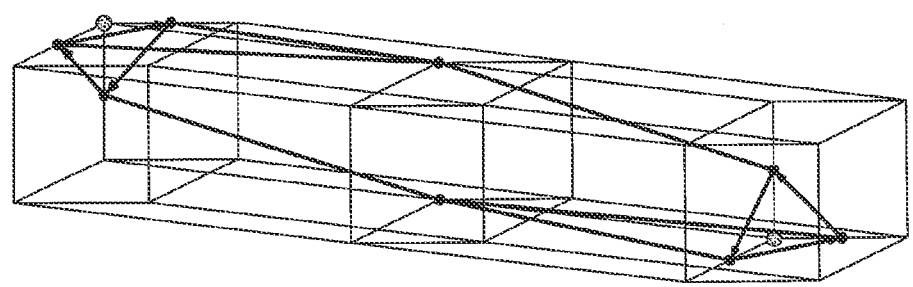

FIG. 14 shows the situation within a 4D neighbourhood cell where two toxels (in this case tesseracts) "of the same type" have a contact surface 36 in common. The contact surface 36 can be seen in FIG. 14a in the contact cube 35. FIG. 14b shows the initial connecting lines 15 which extend between the individual auxiliary points 6 via the connecting points 6. As disclosed previously and shown in FIG. 14b, these connecting lines are positioned in the manner of antiparallel double vectors. Depending on whether a "connection mode" or a "separation mode" is selected, the corresponding vector is suitably "elbowed" in the region of the contact surface 36 and continued. This is shown in FIG. 14c. If the "connection mode" is selected, the resulting auxiliary curve 14 follows the path illustrated in the form of a black arrow. By contrast, if the "separation mode" is active, the auxiliary curve 14 follows the path illustrated by way of a white double-headed arrow.

FIG. 14d shows the result when the "separation mode" is used, whilst FIG. 14e shows the result when the "connection mode" is used.

For completeness, it is noted that when the presently proposed preferred embodiment of an algorithm is used in the case of two toxels "of the same type", which merely have one connecting line or merely a single point in common, the "separation mode" is automatically used. Of course, a different mode of operation is also possible.

Of course, it is also possible to reduce the boundary volumes to tetrahedra in four dimensions—analogously to in three dimensions, where the boundary surface is reduced to triangles. This may also have numerical advantages and/or speed advantages, in particular if graphics cards having their own coprocessors are used.

Figure 15:
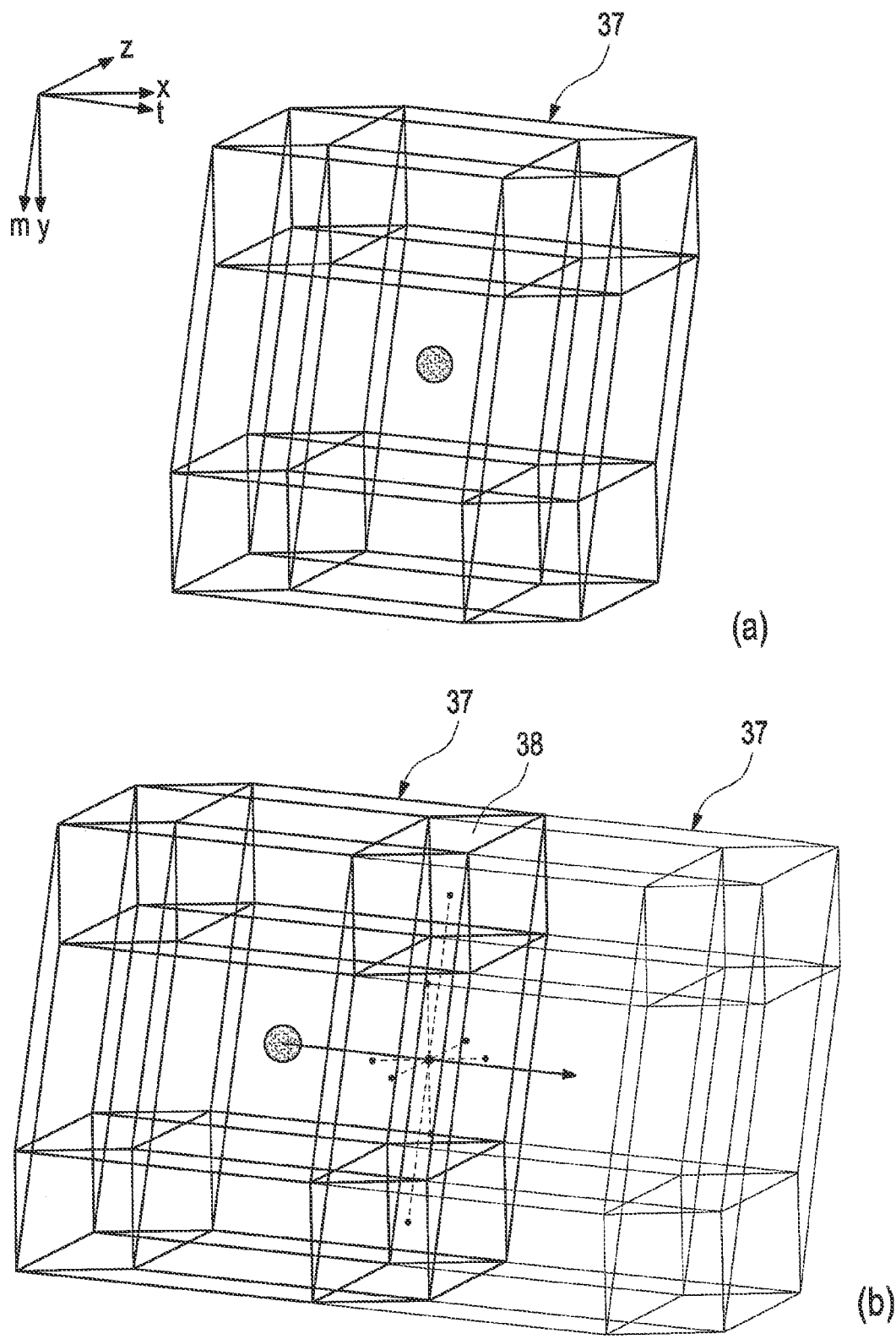
FIG. 15 shows an example of the application of the method to five-dimensional data.

Finally, FIG. 15 also shows in brief the application of the proposed algorithm for a five-dimensional space. The embodiment shown in FIG. 15a involves is a five-dimensional hypercube, known as a penteract 37. As is known from mathematics, a penteract 37 is delimited by ten tesseracts 38. In this context, FIG. 15b illustrates the contact tesseract 38 which forms the connection between two penteracts 37. In this context, the penteract 37 illustrated on the left of the drawing is a "dark" penteract, whilst the penteract 37 shown on the right is a "light" penteract. There is thus a contrast, represented by the contrast transition arrow 26, between the two penteracts 37 of FIG. 15. Analogously to in lower dimensions (the above description having described in detail the two-dimensional, three-dimensional and four-dimensional cases), in this case too the connecting hyperelements (in this case a tesseract 38) positioned along the contrast transition 26 are initially reduced to the centrally positioned auxiliary point 6 thereof. Starting from the centrally positioned auxiliary point 6, connecting lines in the form of antiparallel vectors to the respectively adjacent auxiliary points 6 are drawn via the respective connecting points 29.

Figure 16:
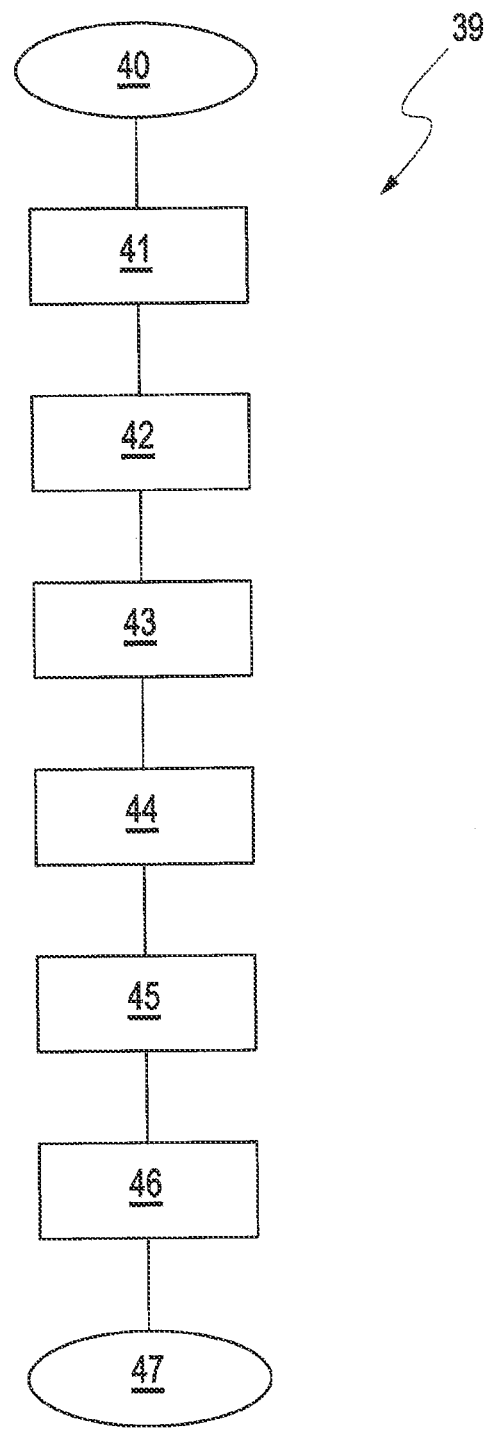
FIG. 16 shows a possible method for extracting hypersurfaces in the form of a flow chart.

Finally, FIG. 16 further shows a hypersurface extraction method 39 in a schematic flow chart. Initially, the data which are in matrix form (the matrices being of a corresponding dimension such as a dimension of four) are read 40 into the corresponding device. The device may for example be a conventional commercial, program-controlled computer. Preferably, the computer comprises a plurality of processors, since the proposed method can be run in parallel, in such a way that a significant time gain can be made when calculating the hypersurfaces.

Subsequently, the method starts by identifying 41 ("identifying interposed intermediate hypersurfaces") preliminary hypersurface regions, between which there is a contrast transition, between respectively adjacent matrix elements. In this context, whether there is a sufficient contrast transition can be defined using corresponding parameters. In particular, a boundary value can be defined in such a way that there is a sufficient contrast transition when the data in one matrix element are above the boundary value and those in the adjacent matrix element are below the boundary value.

On the basis of the preliminary hypersurface regions which are thus determined, the auxiliary points 6 respectively positioned in the centre of the hypersurface regions are calculated 42. Subsequently, in a further method step 43 the positioning of the connecting points 29 is calculated. Using the knowledge of the auxiliary points 6 and the connecting points 29, the connecting lines 15 are subsequently "laid out" in the form of antiparallel vectors and assembled to form hypersurface components (method step 44). Subsequently, in a further method step 45, the hypersurface components determined in this way are initially optimised, and in a subsequent further method step 46, the optimised hypersurface components are combined to form an overall boundary hypersurface (or optionally a plurality thereof). The data obtained in this manner are stored in an output step, after which the hypersurface extraction method 39 ends.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 image
2 two-dimensional grid
3 light image point
4 dark image point
5 intermediate hypersurface
6 auxiliary point
7 closed curve (anticlockwise)
8 closed curve (clockwise)
9 contact point
10 dark voxel
11 light voxel
12 three-dimensional grid
13 surface
14 auxiliary curve
15 connecting line
16 triangle
17 octahedron
18 normal vector
19 contact line
20 boundary line
21 overall volume
22 hypersurface component
23 support line
24 dark tesseract
25 four-dimensional grid
26 contrast transition
27 light tesseract
28 intermediate cube
29 connecting point
30 toxel number 7
31 volume element number 11+
32 volume element number 9−
33 volume element number 6−
34 volume element number 18+
35 contact volume
36 contact surface
37 penteract
38 contact tesseract
39 hypersurface extraction method
40 read in data
41 identifying hypersurface regions
42 calculating auxiliary points
43 calculating connecting points
44 laying out auxiliary lines and calculating hypersurface components
45 optimising hypersurface components
46 assembling hypersurface components
47 storing data
48 intermediate cube eighth

What is claimed is:

1. A method for producing, by a computer device having one or more processors, at least one boundary hypersurface from a data matrix, the method comprising:
receiving the data matrix;
identifying contrast transitions situated between respective pairs of matrix elements;
placing, by the one or more processors, at each identified contrast transition, an intermediate hypersurface;
representing, by the one or more processors, each intermediate hypersurface with a structure including an auxiliary point and one or more connecting points, wherein the auxiliary point is positioned on a line that connects the corresponding two respective matrix elements between which a contrast transition is situated, and wherein the one or more connecting points are each positioned on a boundary with another intermediate hypersurface;
generating, by the one or more processors, one or more vector paths that connect, in a defined sequence to form directionally oriented closed curves that form hypersurface components, auxiliary points of intermediate hypersurfaces by extending through connecting points between adjacent auxiliary points;

combining, by the one or more processors, hypersurface components formed by the one or more directionally oriented closed curves to form at least one boundary hypersurface;

wherein the data matrix has a dimension n and the hypersurface has a dimension n−1;

wherein, if the connecting points comprise one or more contact points, a contact point being a connecting point having neighboring matrix elements internal to the hypersurface which contact one another in at most n−2 dimensions, the one or more processors generate the vector paths by selecting one of a connection mode or a separation mode, such that in the connection mode, the one or more processors generate vector paths to include the contact points in the region internal to the hypersurface, and in the separation mode, the one or more processors generate the vector paths to exclude the contact points from the region internal to the hypersurface; and storing data representative of the at least one boundary hypersurface.

2. The method according to claim 1, wherein the each auxiliary point of the structure representing a respective intermediate hypersurface is located at the center of the respective intermediate hypersurface.

3. The method according to claim 1, wherein at least one closed curve and/or at least one hypersurface component is optimized, at least at times and/or at least in part.

4. The method according to claim 1, wherein at least one auxiliary point and/or at least parts of at least one of the directionally oriented closed curves and/or at least one hypersurface component and/or at least one part of at least one boundary hypersurface are placed and/or displaced as a function of the data values of adjacent data matrix elements.

5. The method according to claim 1, wherein the identifying contrast transitions situated between respective pairs of matrix elements comprises using a boundary value.

6. The method according to claim 5, wherein the boundary value is variable by a user.

7. The method according to claim 1, further comprising inserting at least one additional auxiliary structure in at least one boundary hypersurface at least at times and/or at least in regions.

8. The method according to claim 1, further comprising carrying out a smoothing step at least at times for at least part of at least one boundary hypersurface.

9. The method according to claim 7, further comprising carrying out a smoothing step at least at times for at least part of at least one boundary hypersurface.

10. The method according to claim 1, wherein the data matrix has a number of dimensions between three and twenty.

11. The method according to claim 1, wherein one of the dimensions of the data matrix is time (t).

12. The method according to claim 10, wherein one of the dimensions of the data matrix is time (t).

13. The method according to claim 1, wherein data included in the data matrix includes measurement values.

14. The method according to claim 3, wherein the at least one closed curve and/or at least one hypersurface component is reduced.

15. The method according to claim 3, wherein the at least one closed curve and/or at least one hypersurface component locally minimized.

16. The method according to claim 1, further comprising providing a grid structure having lines that define edges of interior regions, wherein each interior region contains a single individual element of the data matrix.

17. The method according to claim 16, wherein placing, by the one or more processors, at each identified contrast transition, an intermediate hypersurface comprises placing the intermediate hypersurfaces on the grid structure.

18. The method according to claim 1, wherein the defined sequence has the form "A"→"C"→"A"→"C"→ . . . , wherein "A" represents an auxiliary point and "C" represents a connecting point.

19. A computer device configured to carry out a method for producing at least one boundary hypersurface from a data matrix, the computer device comprising:

one or more processor readable memories configured to store the data matrix and to store data representative of the at least one boundary hypersurface;

one or more processors configured to:
identify contrast transitions situated between respective pairs of matrix elements;
place, at each identified contrast transition, an intermediate hypersurface;
represent each identified intermediate hypersurface with a structure including an auxiliary point and one or more connecting points, wherein the auxiliary point is positioned on a line that connects the corresponding two respective matrix elements between which a contrast transition is situated, and wherein the one or more connecting points are each positioned on a boundary with another intermediate hypersurface;
generate one or more vector paths that connect, in a defined sequence to form directionally oriented closed curves that form hypersurface components, auxiliary points of intermediate hypersurfaces by extending through connecting points between adjacent auxiliary points; and
combine hypersurface components formed by the one or more directionally oriented closed curves to form at least one boundary hypersurface, wherein the data matrix has a dimension n and the hypersurface has a dimension n−1;

wherein, if the connecting points comprise one or more contact points, a contact point being a connecting point having neighboring matrix elements internal to the hypersurface which contact one another in at most n−2 dimensions, the one or more processors generate the vector paths by selecting one of a connection mode or a separation mode, such that in the connection mode, the one or more processors generate vector paths to include the contact points in the region internal to the hypersurface, and in the separation mode, the one or more processors generate the vector paths to exclude the contact points from the region internal to the hypersurface.

* * * * *